US006920176B2

(12) United States Patent
Kajita et al.

(10) Patent No.: US 6,920,176 B2
(45) Date of Patent: Jul. 19, 2005

(54) IMAGE DECODING DEVICE AND IMAGE DECODING METHOD

(75) Inventors: Satoshi Kajita, Yukuhashi (JP); Shintaro Yokoyama, Kanazawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 803 days.

(21) Appl. No.: 09/921,453

(22) Filed: Aug. 2, 2001

(65) Prior Publication Data

US 2002/0054709 A1 May 9, 2002

(30) Foreign Application Priority Data

Aug. 4, 2000 (JP) ........................................ 2000-236493

(51) Int. Cl.[7] .............................................. H04N 7/12
(52) U.S. Cl. .............................. 375/240.12; 348/419.1; 348/394.1
(58) Field of Search ..................... 375/240.12, 240.03, 375/240.05, 240.24; 709/247; 714/798; 348/394.1, 419.1, 453, 450

(56) References Cited

U.S. PATENT DOCUMENTS

| 5,335,016 A | * | 8/1994 | Nakagawa ............. 375/240.03 |
| 5,604,540 A | | 2/1997 | Howe |
| 5,822,541 A | * | 10/1998 | Nonomura et al. ......... 709/247 |
| 5,844,608 A | | 12/1998 | Yu et al. |
| 5,969,768 A | | 10/1999 | Boyce et al. |
| 6,466,620 B1 | * | 10/2002 | Lee ........................ 375/240.03 |
| 6,574,275 B1 | * | 6/2003 | Katayama ............... 375/240.05 |
| 6,591,396 B1 | * | 7/2003 | Honda ........................ 714/798 |
| 6,654,418 B2 | * | 11/2003 | Haskell et al. .......... 375/240.03 |

FOREIGN PATENT DOCUMENTS

| JP | 2001-054119 | 2/2001 |
| JP | 2001054119 | 2/2001 |

OTHER PUBLICATIONS

ISO/IEC 14496–2; Information technology—Coding of audio–visual objects, Part 2: Visual; Amendment 1: Visual extensions; First edition—Dec. 01, 1999, Amendment 1—Jul. 15, 2000.

* cited by examiner

Primary Examiner—Gims Philippe
(74) Attorney, Agent, or Firm—Darby & Darby

(57) ABSTRACT

After completion of a prediction process for a single line in an image of size S, the DC components and AC components, held in a lower stage part of a predicted luminance value storage are copied into a line part. This copying is done to use the DC components and AC components that have been copied into line part as reference values for the prediction process of the target macro blocks of the next single line. Performing the prediction process while repeating such copying eliminates the need to secure the area for storing of the DC components and AC components of the entire image size in predicted luminance value storage for the prediction process.

11 Claims, 20 Drawing Sheets

IMAGE DECODING DEVICE AND IMAGE DECODING METHOD

BACKGROUND OF THE INVENTION

1. Field of the Invention

This invention concerns an image decoding device and method for decoding, in target macro block units, coded image signals that are coded by DCT, quantization, and variable-length coding.

2. Description of the Related Art

In the field of image coding technology, a standard called MPEG4 is specified and standardized in the specifications titled, "ISO/IEC14496-2 Information Technology—Generic Coding of Audio-Visual Object."

However, this document does not describe methods of implementing the decoding of image signals coded in accordance with MPEG4.

Also, though the book titled "MPEG-4 No Subete" (Japanese term meaning "All About MPEG4"; Miki et al, 1998, published by Kogyo Chosakai Publishing Co., Ltd.) provides a description of the principles of a decoding method for this type of coded signal, it does not provide specific methods of implementation. Besides the above, substantial literature concerning specific implementation methods could not be found.

Thus, a specific method of implementation is now considered. First as described in the abovementioned book, an entire image size is comprised by arranging areas of 16×16 pixels, called macro blocks, vertically and horizontally. Each macro block is associated with a total of six types of data, that is, the luminance values (Y1, Y2, Y3, and Y4) concerning the four blocks (each comprised of 8×8 pixels) at the upper left, upper right, lower left, and lower right and two color difference values (Cb and Cr). These data are processed in the order, Y1, Y2, Y3, Y4, Cb, and Cr.

With regard to the prediction process for decoding coded image signals, the abovementioned specifications do not indicate limits concerning the memory area to be used for the prediction process. Therefore, this memory area may be set freely.

The method of securing a memory area corresponding to the image size as the memory area to be used for the prediction process may thus be considered.

OBJECTS AND SUMMARY OF THE INVENTION

In actuality, an image processor that realizes a prediction process is limited by its storage capacity and cannot carry an unlimited amount of memory.

Increasing the memory carried increases the consumption power of the image processor and increases of the chip size. This decreases the duration of continuous use of the equipment loaded with the processor and increases the production cost of the processor.

It is therefore an object of this invention to provide an image decoding device and method by which the memory area to be used for the prediction process in the decoding of coded image signals is reduced.

A first mode of this invention provides an image decoding device, which decodes in target macro block units, coded image signals that are coded by DCT, quantization, and variable-length coding, an image decoding device consisting of a target macro block setting means, which sets the target macro block to be decoded currently from among the entire image size, a target macro block extraction means, which performs a variable length decoding process and a zigzag scan on the coded image signal and extracts the data of the target macro block, a prediction means, which performs a DC/AC prediction process on the extracted target macro block data, an inverse quantization means, which performs inverse quantization on the target macro block data that have been subject to the prediction process, and an inverse DCT means, which performs inverse DCT on the target macro block data that have been subject to inverse quantization and outputs the image of this target macro block, and characterized in that the prediction means is equipped with a reference value storage means, which holds reference values that are necessary for the prediction process performed on the target macro block, a prediction computation means, which performs prediction computation based on the reference values of the reference value storage means, a predicted value storage means, which holds the prediction computation results, and a prediction control means, which controls the reference value storage means, prediction computation means, and predicted value storage means, the total storage volume of the reference value storage means and predicted value storage means is smaller than the storage volume for the predicted values for the entire image size, and the prediction control means copies the data, necessary for the prediction computation of the next target macro block, from the predicted value storage means to the reference value storage means.

With the above arrangement, the data necessary for the next prediction process can be copied from the predicted value storage means to the area in the reference value storage means in which the reference values that have become unnecessary for the prediction process are held. The next prediction process is then performed using the data that have been copied into the reference value storage means.

Performing the prediction process while repeating such a copying procedure reduces the volume of the reference value storage required in the reference value storage means and eliminates the need to secure an area for storing the predicted values for the entire image size in the predicted value storage means for the prediction process. As a result, the memory area to be used for the prediction process in the decoding of coded image signals is reduced.

With an image decoding device of a second mode of this invention, the reference value storage means is consists of a line part, which holds the DC components and AC components for a single line in the image size, a corner part, which holds one DC component, and a left part, which holds the DC components and AC components of the block located immediately prior and adjacently to the left side of the target macro block.

With this arrangement, the DC components and AC components necessary for the prediction process of target macro blocks of a single line can be copied into the line part.

The DC components and AC components that have been copied into the line part can thus be used as reference values for the prediction process of the target macro blocks of the next single line.

Performing the prediction process by repeating such a copying process thus eliminates the need to hold the DC components and AC components necessary for the prediction process of the target macro blocks of the next single line in the predicted luminance value storage means.

Furthermore, with this arrangement, the data necessary for the prediction process of the current target macro block, that is, the DC components and AC components of the block, located immediately prior and adjacently to the left side, can be copied into the left part.

The DC components and AC components, which have been copied into the left part, can thus be used in the prediction of the current target macro block.

Performing the prediction process by repeating such a copying process eliminates the need to hold the DC components and AC components of the block, located immediately prior and adjacently to the left side of the current target macro block, for the prediction process of the current target macro block in the predicted value storage means.

As a result of the above, it is sufficient to secure just an area for holding at least the DC components and AC components of one target macro block in the predicted luminance value storage means.

The memory area used for the prediction process in the decoding of coded image signals is thus further reduced.

With an image decoding device of a fourth mode of this invention, the left part is allocated to two sets of DC components and AC components for the four luminance components of the target macro block.

This arrangement provides more adequately for the case where the target macro block consists of four luminance components in accordance with standardized specifications. In particular, this is favorable for the prediction process in decoding image signals coded in accordance with MPEG-4 specifications.

With an image decoding device of a fifth mode of this invention, the predicted value storage means consists of areas that can hold the DC components and AC components of the respective positions in a process in which the target macro block is moved by one line in the image size.

By this arrangement, the copying by the prediction control means can be performed in a batch of one line at a time to simplify the process.

With an image decoding device of a sixth mode of this invention, the predicted value storage means consists of an area that can hold the DC components and AC components of one target macro block.

By this arrangement, the copying by the prediction control means can be used in the most rational manner and the memory area used for the prediction process is reduced significantly.

A seventh mode of this invention provides, in an image decoding method for decoding, in target macro block units, coded image signals that are coded by DCT, quantization, and variable-length coding, an image decoding method comprised of a first step of setting the target macro block to be decoded currently, a second step of performing a variable length decoding process and a zigzag scan on the coded signal and extracting the data of the target macro block, a third step of performing a DC/AC prediction process on the extracted target macro block data, a fourth step of performing inverse quantization on the target macro block data that have been subject to the prediction process, and a fifth step of performing inverse DCT on the target macro block data that have been subject to inverse quantization and outputting the image of this target macro block, and in the third step, a storage area, which is smaller in storage volume than the storage volume for the predicted values for the entire image size, is used and the prediction process is performed while copying the data, necessary for the prediction computation of the next target macro block, into this storage area.

Performing the prediction process while copying into a storage area that is smaller in storage volume than the storage volume for the predicted values for the entire image size in the above manner eliminates the need to secure an area for storing the predicted values of the entire image size for the prediction process. As a result, the memory area used for the prediction process in the decoding of coded image signals is reduced.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS (Embodiment 1)

Figure 1:
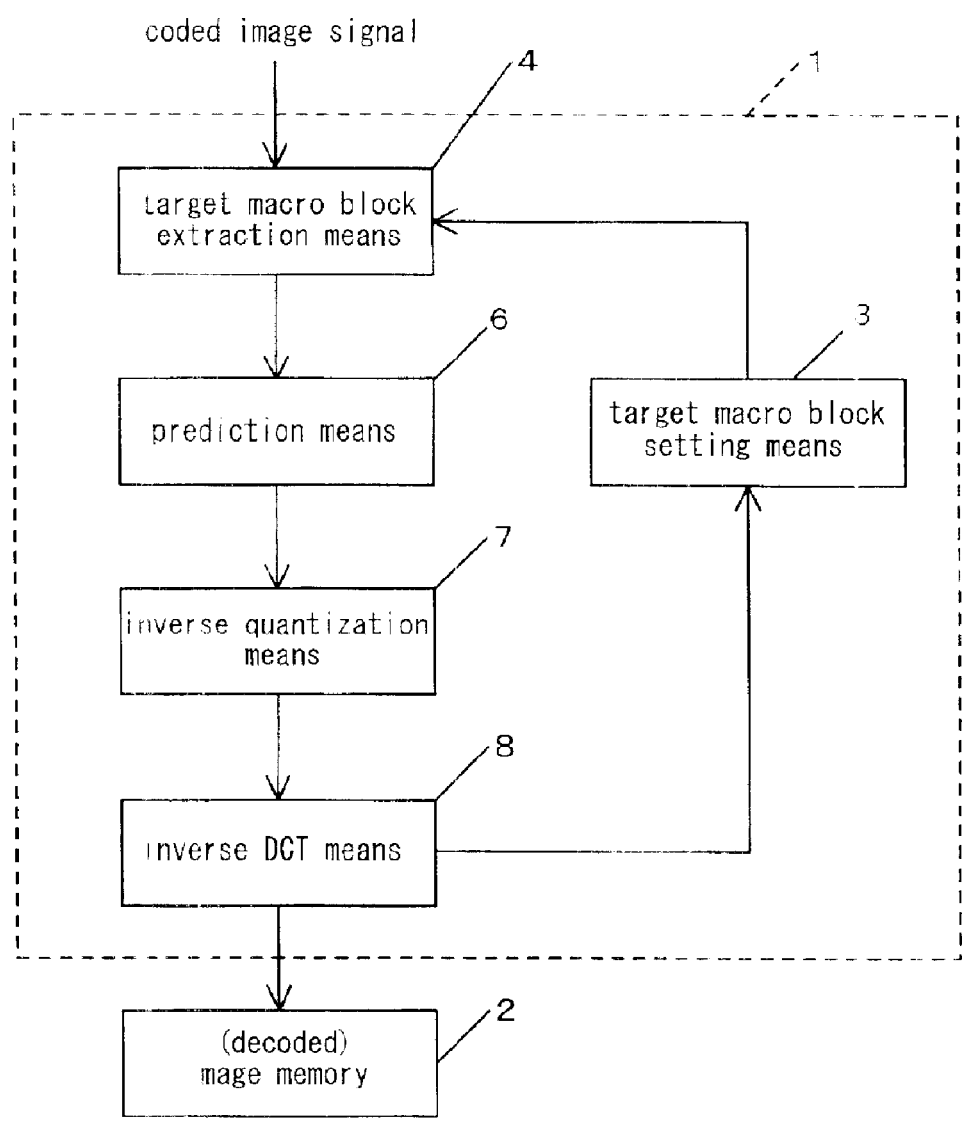
FIG. 1 is a block diagram of an image decoding device according to an embodiment of this invention.

Referring to FIG. 1, an image decoding device of an embodiment of the invention, shown generally at 1, decodes and outputs the resulting data to an image memory 2. The data entering the image memory 2 is in target macro block units that are coded image signals coded by DCT (discrete cosine transform), quantization, and variable-length coding.

Image decoding device 1 is equipped with a target macro block setting means 3, a target macro block extraction means 4, a prediction means 6, an inverse quantization means 7, and an inverse DCT means 8.

Target macro block setting means 3 selects the target macro block to be decoded from among the entire image size, for example, by designating position information or a block number, etc. Target macro block extraction means 4 performs a variable length decoding process and a zigzag scan on the coded image signal and extracts the data of the selected target macro block.

Prediction means 6 performs a DC/AC prediction process on the extracted target macro block data. Inverse quantization means 7 performs inverse quantization on the target macro block data that have been subject to the prediction process. Inverse DCT means 8 performs an inverse DCT process on the target macro block data that have been subject to inverse quantization and outputs the image of this target macro block to image memory 2.

When the inverse DCT is completed, inverse DCT means 8 notifies this fact to target macro block setting means 3. Upon receiving this notification, target macro block setting means 3 steps the identification of the target macro block to the next target macro block.

Figure 2:
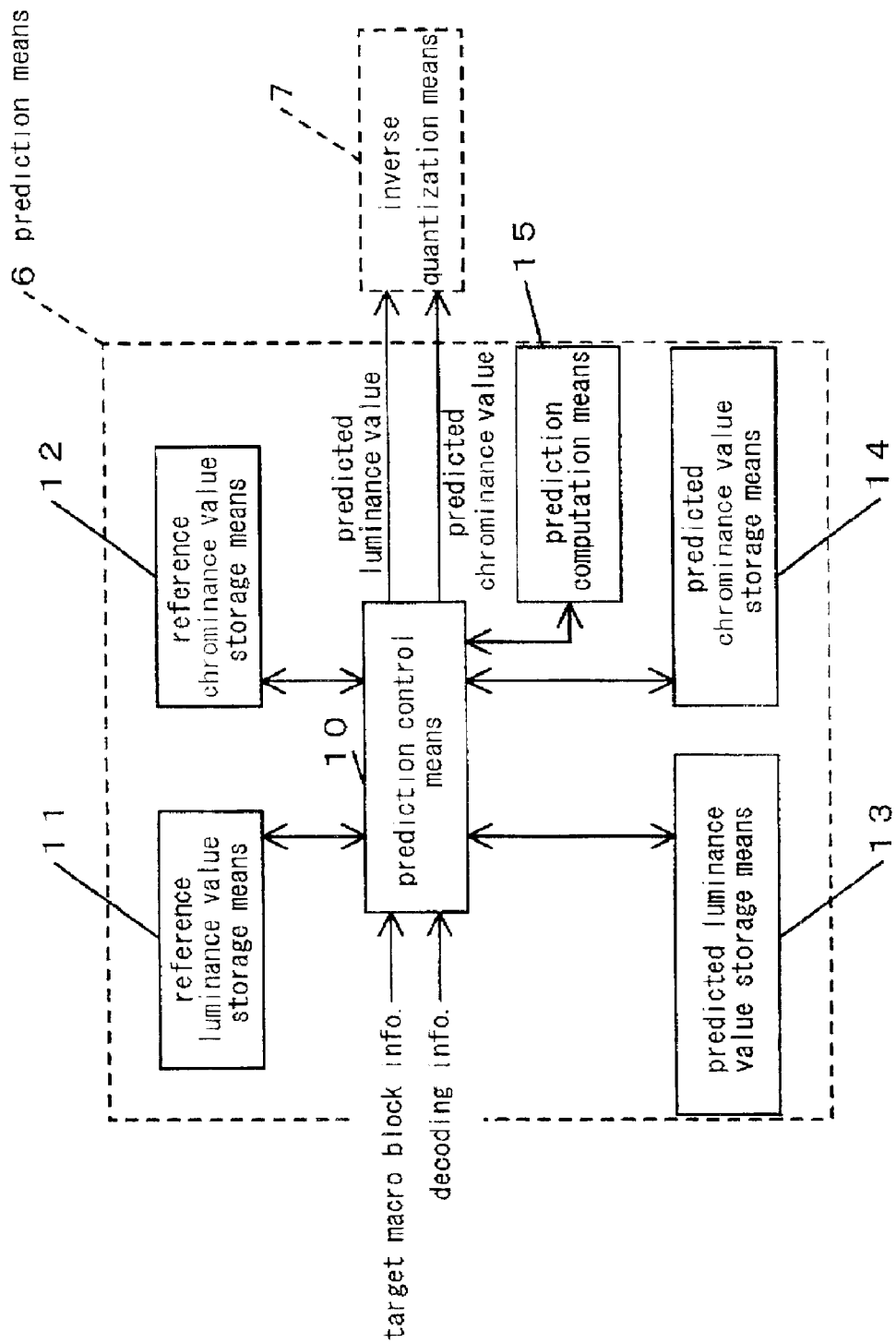
FIG. 2 is a block diagram of a prediction means of an embodiment of this invention.

Referring now to FIG. 2, prediction means 6, shown in FIG. 1, includes a prediction control means 10, a reference luminance value storage means 11, a reference chrominance value storage means 12, a predicted luminance value storage means 13, a predicted chrominance storage means 14, and a prediction computation means 15. The storage means 11, 12, 13, and 14 may be arranged as separate storage media or they may be arranged as separate areas in a single memory medium (for example, a memory).

Reference luminance value storage means 11 holds reference values necessary for the prediction process concerning the luminance of the target macro block. Reference chrominance value storage means 12 holds reference values necessary for the prediction process concerning the chrominance of the target macro block.

Prediction computation means 15 performs prediction computation based on the reference values of reference luminance value storage means 11 and reference chrominance value storage means 12. Predicted luminance value storage means 13 holds the results of prediction computation based on the reference values of reference luminance value storage means 11. Predicted chrominance value storage means 14 holds the results of prediction computation based on the reference values of reference chrominance value storage means 12.

Prediction control means 10 controls reference luminance value storage means 11, reference chrominance value storage means 12, predicted luminance value storage means 13, predicted chrominance value storage means 14, and prediction computation means 15.

Though a more detailed description is provided below, the total of the reference value storage volumes of reference luminance value storage means 11 and reference chrominance value storage means 12 and the predicted value storage volumes of predicted luminance value storage means 13 and predicted chrominance value storage means 14 is greatly reduced from the storage volume that would be required for the predicted values for the entire image size.

Prediction control means 10 copies data, which are necessary for the prediction computation concerning the target macro block, from predicted luminance value storage means 13 and predicted chrominance value storage means 14 into reference luminance value storage means 11 and reference chrominance value storage means 12, respectively.

The principles of the DC/AC prediction (principles of prediction computation) carried out in prediction means 6 are now described with reference to FIGS. 3 through 5.

When a prediction process on a target block X is to be carried out, the three blocks at the upper side C, left side A, and diagonally above B the block on which a prediction is to be carried out are referenced. When target block X is subjected to the prediction process, the three blocks of block A, block B, and block C (each comprised of 8×8 pixels) are referenced.

Figure 3:
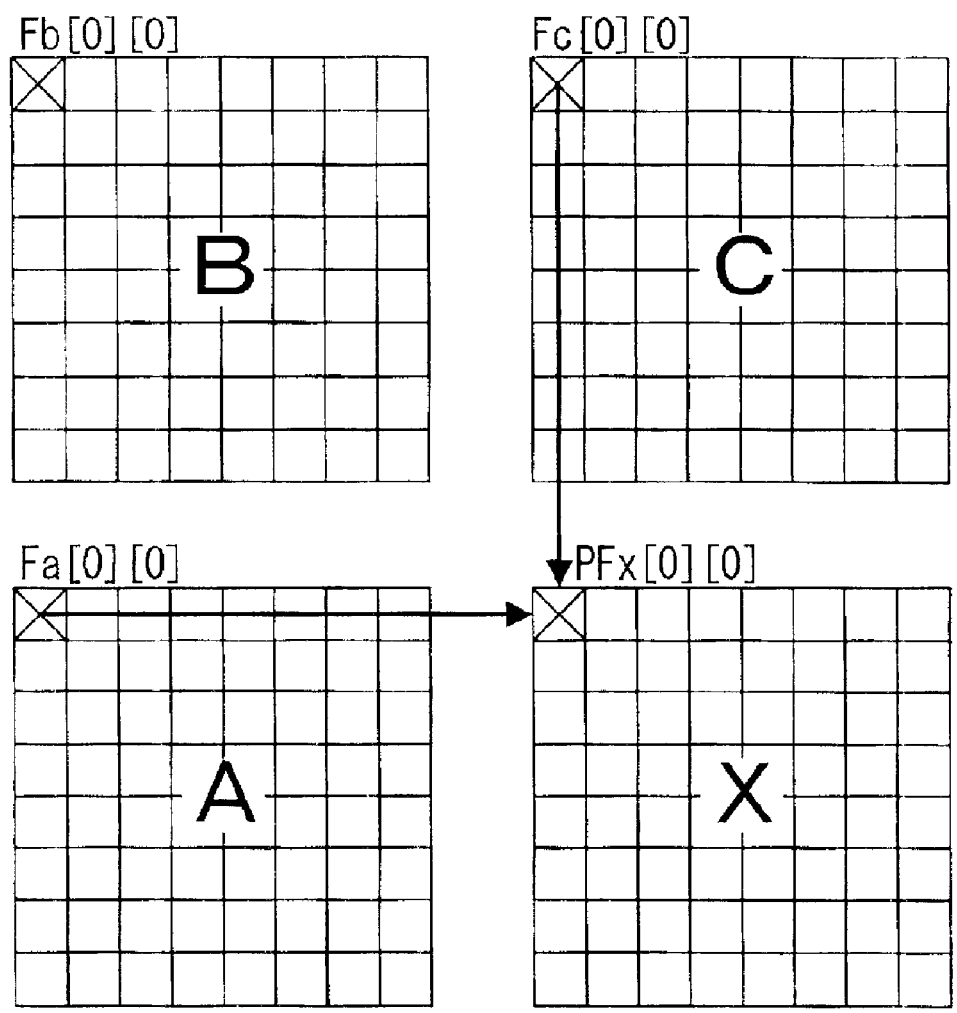
FIG. 3 is a diagram to which reference will be made in explaining the DC prediction of an embodiment of this invention.
Figure 4:
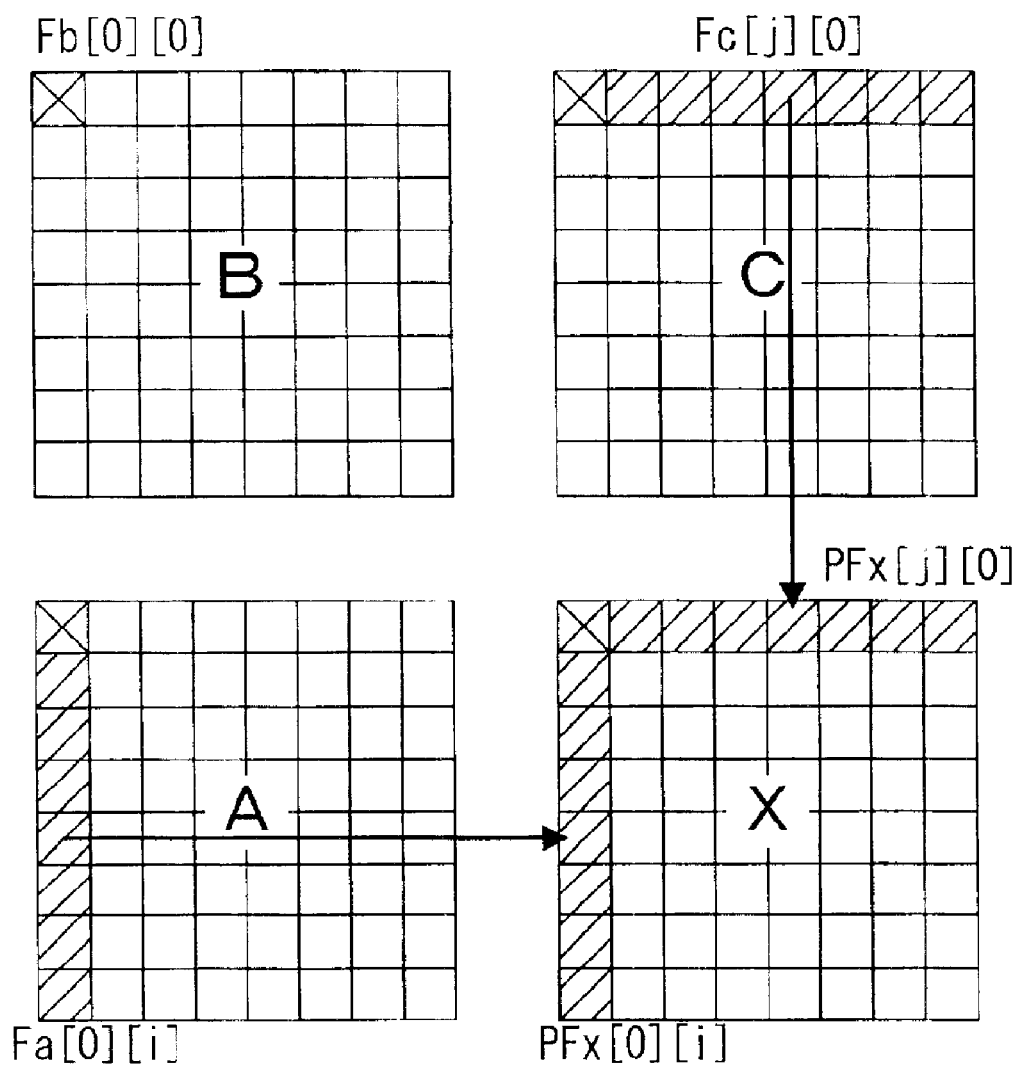
FIG. 4 is a diagram to which reference will be made in the AC prediction of an embodiment of this invention.
Figure 5:
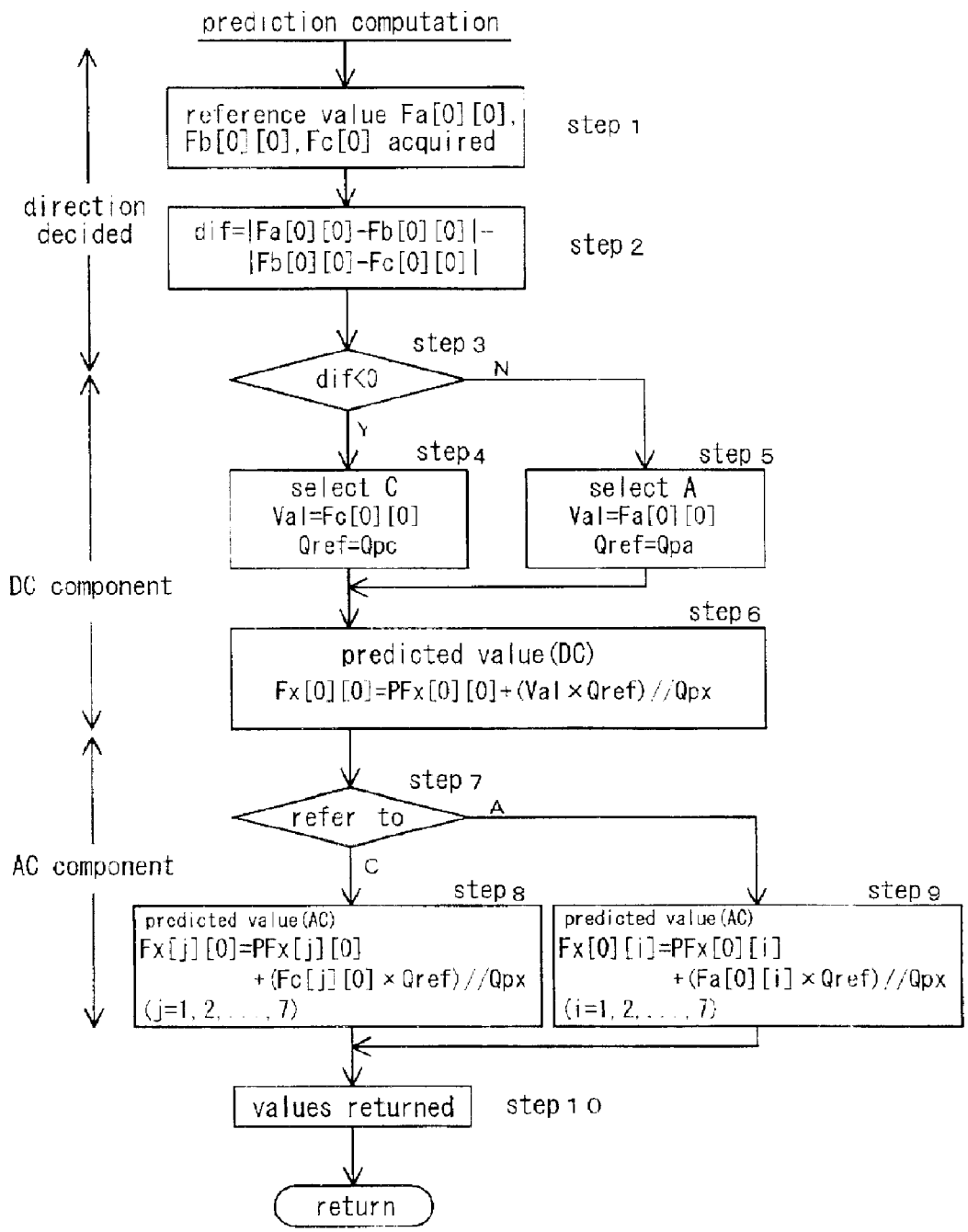
FIG. 5 is a flowchart, which shows the prediction computation of an embodiment of this invention.

To be more specific, in step 1, reference values $Fa[0][0]$, $Fb[0][0]$, and $Fc[0][0]$ are acquired as shown in FIG. 3 and FIG. 5. Here, the suffix a in $Fa[0][0]$ indicates a block in FIGS. 3 and 4, and in this case, indicates the block A.

The [0] at the left side of $Fa[0][0]$ indicates a column in a block in FIGS. 3 and 4, and in this case, indicates the 0 column. The [0] at the right side of $Fa[0][0]$ indicates a row in a block in FIGS. 3 and 4, and in this case, indicates the 0 row. The same holds true for reference values $Fb[0][0]$ and $Fc[0][0]$.

In step 2, the value of dif is determined as dif=$|Fa[0][0]-Fb[0][0]|-|Fb[0][0]-Fc[0][0]|$. || signifies the absolute value.

If in step 3, dif <0, step 4 is entered and the reference block is set to block C. Thus, in this case, the prediction process is carried out based on reference block C. This determines the direction of prediction.

In step 4, the values of Val and Qref are set as Val=$Fc[0][0]$ and Qref=Qpc.

Val is the prediction reference value, Qref is the quantization factor reference value, and Qpc is the quantization factor of block C.

If in step 3, dif is not <0, step 5 is entered and the reference block is set to block A. Thus, in this case, the prediction process is carried out based on reference block A.

In step 5, the values of Val and Qref are set as Val=$Fa[0][0]$ and Qref=Qpa. Here, Qpa is the quantization factor of block A.

In step 6, the predicted value (DC component) of target block X is determined. To be more specific, predicted value $Fx[0][0]=PFx[0][0]+(Val+Qref)//Qpx$. Here, PFx indicates data of target block X, which has been subject to a variable length decoding process, and are input from target macro block extraction means 4 (see FIG. 1). The operator // indicates "rounding in the direction of 0". Qpx is the quantization factor of block X.

Here, the meanings of the suffix x and [0][0] in $Fx[0][0]$, $PFx[0][0]$ are the same as the meanings given above.

If the reference block was set to block C in step 4, step 8 is entered at step 7. Then in step 8, the predicted values (AC components) of target block X are determined as shown in FIGS. 4 and 5. To be more specific, predicted values $Fx[j][0]$ are determined as $Fx[j][0]=PFx[j][0]+(Fa[j][0]\times Qref)//Qpx$. Here, j=1, 2, ..., 7.

If the reference block was set to block A in step 5, step 9 is entered at step 7. Then in step 9, the predicted values (AC components) of target block X are determined. To be more specific, predicted values $Fx[0][i]$ are determined as $Fx[j][0]=PFx[0][i]+(Fa[0][i]\times Qref)//Qpx$. Here, i=1, 2, ..., 7.

In step 10, the predicted values of target block X are returned to prediction control means 10. The processes from step 1 through step 10 are carried out by the prediction computation means 15 shown in FIG. 2.

Thus as is described above, for the prediction process concerning target block X, the block C at the upper side, the block A at the left side, and the block B diagonally above are used.

The overall flow of the image decoding method of image decoding device 1 is now described.

Figure 6:
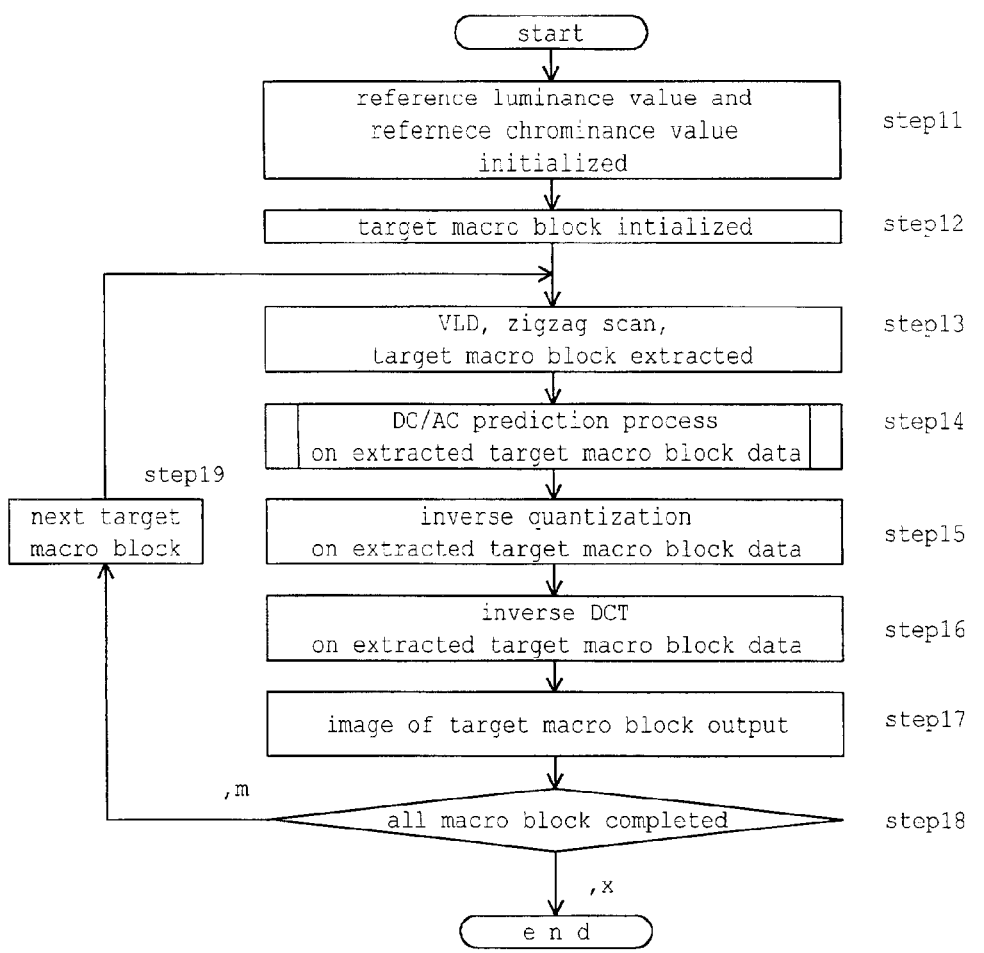
FIG. 6 is a flowchart, which shows the image decoding method of an embodiment of this invention.

Referring now to the flowchart in FIG. 6, the image decoding method begins in step 11 where prediction control means 10 performs initial setting of the reference values held in reference luminance value storage means 11 and reference chrominance value storage means 12. To be more specific, the DC components are set equal to 1024 and the AC components are set equal to 0.

In step 12, target macro block setting means 3 sets the target macro block to be decoded first from among the entire image size (initial setting).

In step 13, target macro block extraction means 4 performs a variable length decoding process (VLD: variable length decoding) and a zigzag scan on the coded image signal and extracts the data of the target macro block. In step 14, prediction means 6 performs a DC/AC prediction process on the extracted target macro block data.

In step 15, inverse quantization means 7 performs inverse quantization (IQ: inverse quantization) on the target macro block data that have been subject to the prediction process. In step 16, inverse DCT means 8 performs inverse DCT on the target macro block data that have been subject to inverse quantization. In step 17, inverse DCT means 8 outputs the image of the target macro block that is obtained in step 16.

If in step 18, the processes from step 13 through 17 have not been completed for all macro blocks, step 19 is entered. In step 19, target macro block setting means 3 steps the target macro block to the next macro block. Target macro block extraction means 4 then extracts the data of the renewed target macro block from the coded image signal.

The processes of steps 13 through 17 are then carried out on the extracted target macro block data. If in step 18, the processes from step 13 through 17 have been completed for all macro blocks, the decoding of the coded image signal by this device is ended.

The prediction process is now described in detail with reference to FIGS. 7 through 10.

Figure 8:
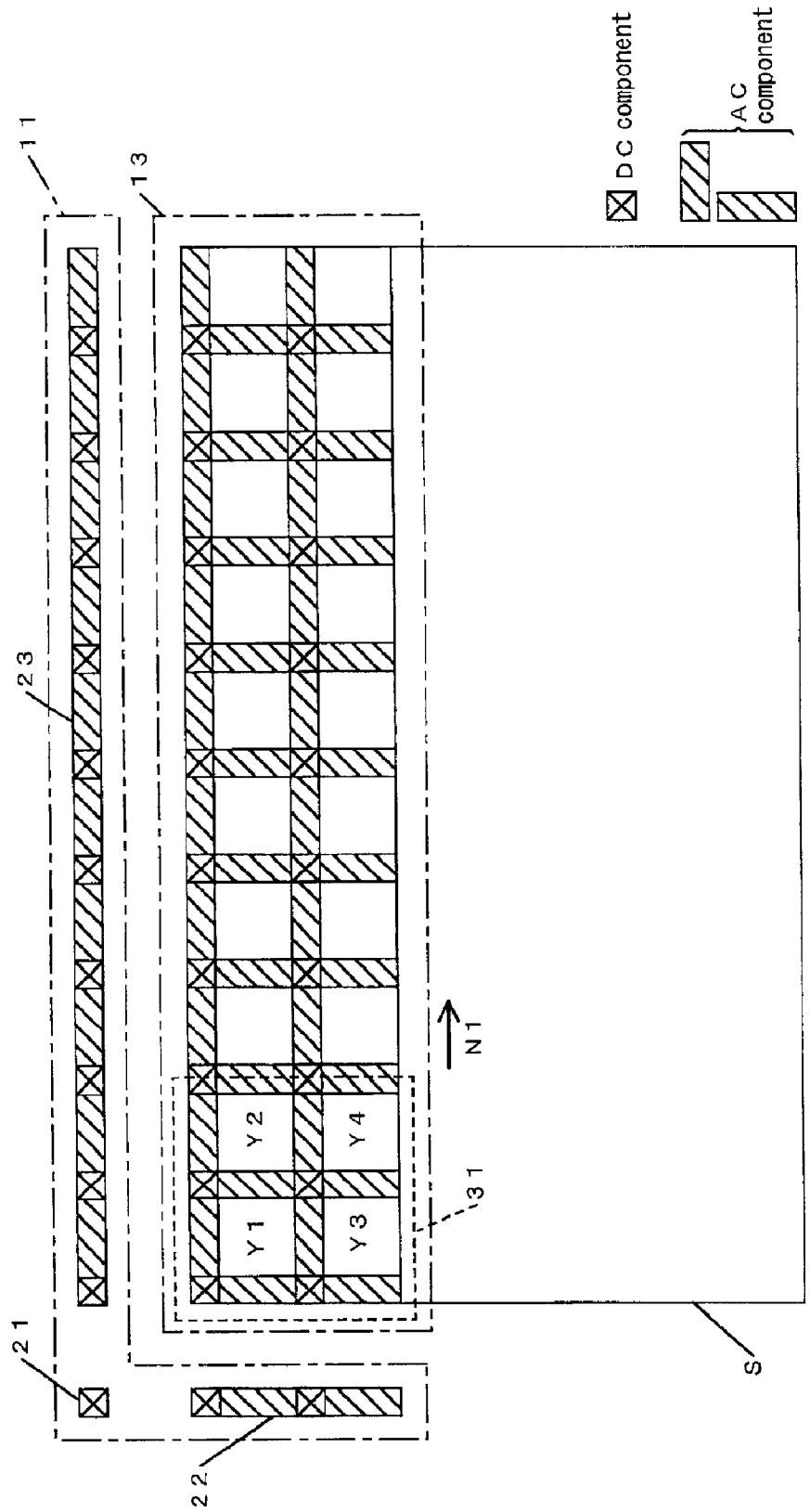
FIGS. 8 and 9 are diagrams to which reference will be made in the luminance prediction process of Embodiment 1 of this invention.

Referring specifically to FIG. 8, reference luminance value storage means 11 has a line part 23, which holds the DC components and AC components of a single line in image size S (which is determined by the number of vertical and horizontal pixels of one frame), a corner part 21, which holds a single DC component, and a left part 22, which holds DC components and AC components. The DC components and AC components held by reference luminance value storage means 11 are reference values to be used in the process of carrying out the prediction process concerning luminance.

For the four luminance components of each target macro block, line part 23 has an area allocated for two sets of DC components and AC components. To be more specific, in the present example, since there are five target macro blocks in a single line in image size S, line part 23 is comprised of memory areas that hold ten DC components and ten AC components.

The storage area that holds one DC component in one of the abovementioned sets is a storage area for one pixel, which is used to store the reference value Fc[0][0] indicated in FIG. 3 or 4, and the storage area that holds one AC component in one of the abovementioned sets is a storage area for seven pixels, which is used to store the reference values Fc[j][0] (j=1, 2, . . . , 7) indicated in FIG. 4.

Left part 22 is allocated for two sets of DC components and AC components for the four luminance components of the target macro block. To be more specific, left part 22 consists of memory areas that hold two DC components and two AC components.

The storage area that holds one DC component in one of the abovementioned sets is a storage area for one pixel. This one-pixel storage area is used to store the reference value Fa[0][0] indicated in FIG. 3 or 4. The storage area that holds one AC component in one of the abovementioned sets is a storage area for seven pixels, which is used to store the reference values Fa[0][i] (i=1, 2, . . . , 7) indicated in FIG. 4.

Predicted luminance value storage means 13 consists of memory areas that hold the DC components and AC components of the luminance of the target macro blocks of a single line in image size S. Put another way, predicted luminance value storage means 13 consists of areas for holding the DC components and the AC components of the respective positions in a process in which the target macro block is moved by one line. As is mentioned above, the DC components and AC components held in predicted luminance value storage means 13 are predicted values obtained as a result of the prediction process based on luminance.

Figure 10:
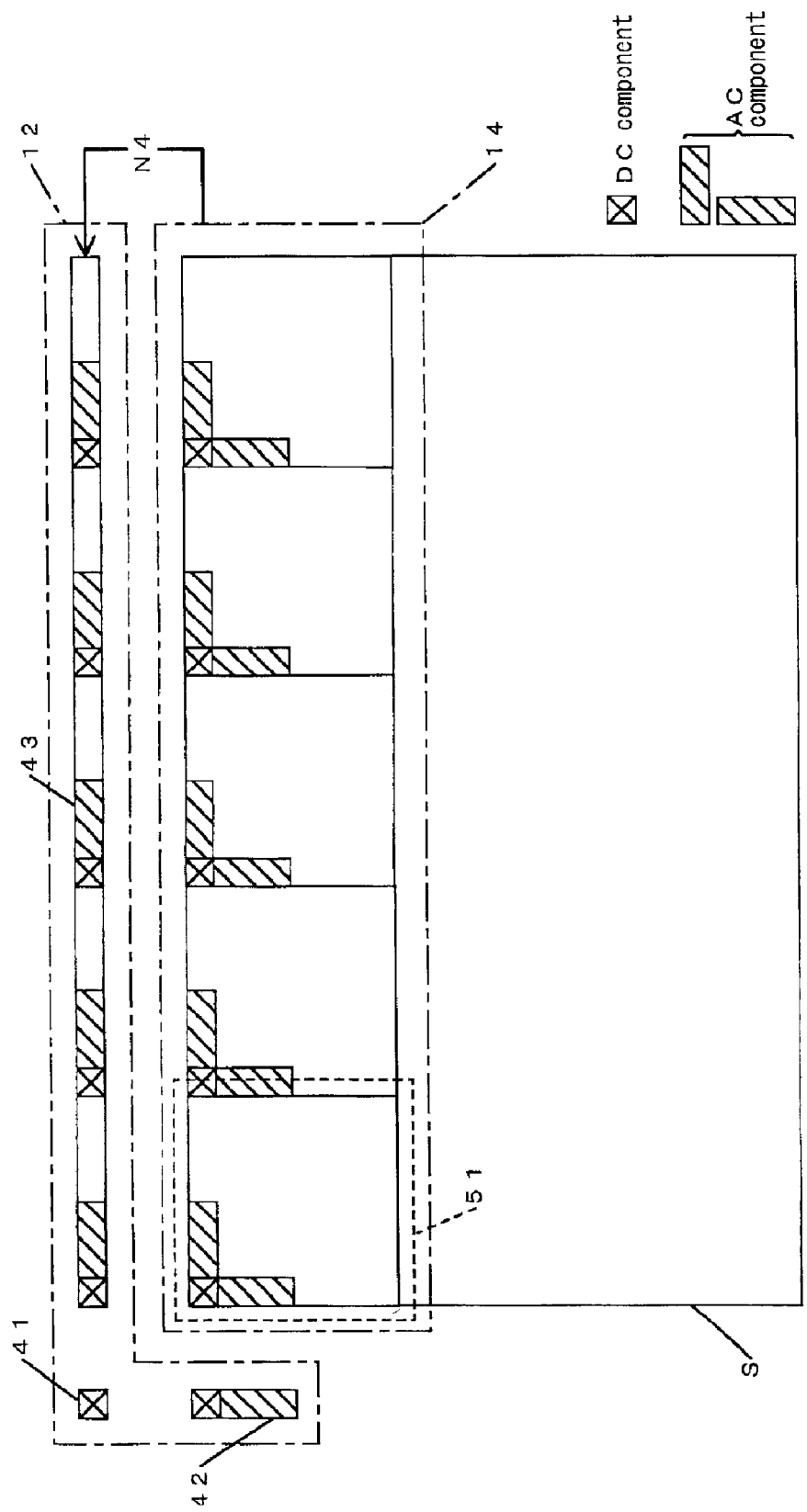
FIG. 10 is a diagram to which reference will be made in the chrominance prediction process of Embodiment 1 of this invention.

Referring now to FIG. 10, the details of the reference chrominance value storage means 12 and predicted chrominance value storage means 14, which are shown in FIG. 2 and are necessary for carrying out the prediction process, are now described.

Reference chrominance value storage means 12 has a line part 43, which holds the DC components and AC components of a single line in image size S, a corner part 41, which holds a single DC component, and a left part 42, which holds DC components and AC components. The DC components and AC components held by reference chrominance value storage means 12 are reference values to be used in the process of carrying out the prediction process concerning chrominance.

For each target macro block, line part 43 has an area allocated for one set of DC components and AC components. To be more specific, in the present example, since there are five target macro blocks in a single line in image size S, line part 43 consists of memory areas that hold five DC components and five AC components.

Left part 42 is allocated for one set of DC components and AC components for the target macro block. To be more specific, left part 42 consists of memory areas that hold one DC component and one AC component.

Predicted chrominance value storage means 14 of FIG. 2 consists of memory areas that hold the DC components and AC components of the chrominance of the target macro blocks of a single line in image size S. Put in another way, predicted chrominance value storage means 14 consists of areas that can hold the DC components and AC components of the respective positions in a process in which the target macro block is moved by one line. The DC components and AC components held in predicted chrominance value storage means 14 are predicted values resulting from the prediction process concerning chrominance.

Reference chrominance value storage means 12 and predicted chrominance value storage means 14 are provided respectively for the two types of chrominances, Cb and Cr.

The total sizes of the reference value storage volumes of reference luminance value storage means 11 and reference chrominance value storage means 12 and the predicted value storage volumes of predicted luminance value storage means 13 and predicted chrominance value storage means 14 is smaller than the storage volume for the predicted luminance and chrominance values for the entire image size.

Figure 7:
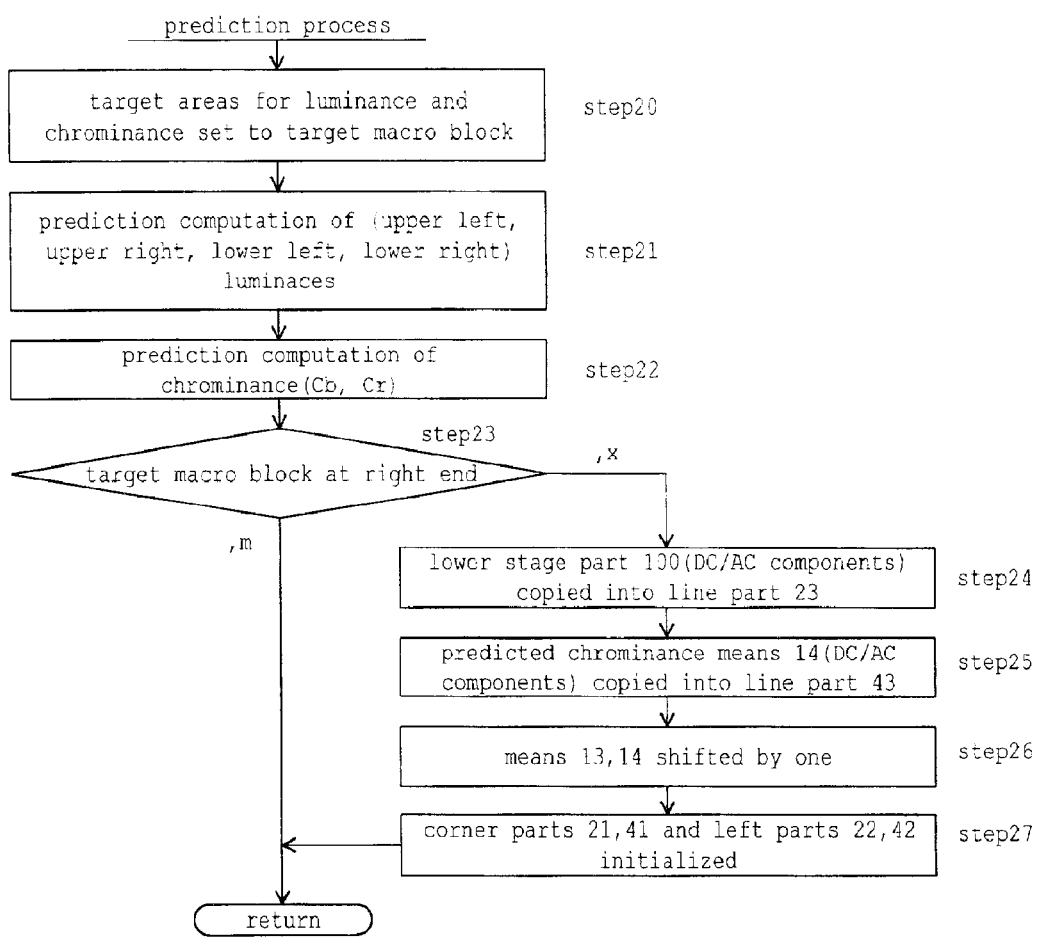
FIG. 7 is a flowchart, which shows the prediction process of Embodiment 1 of this invention.
Figure 9:
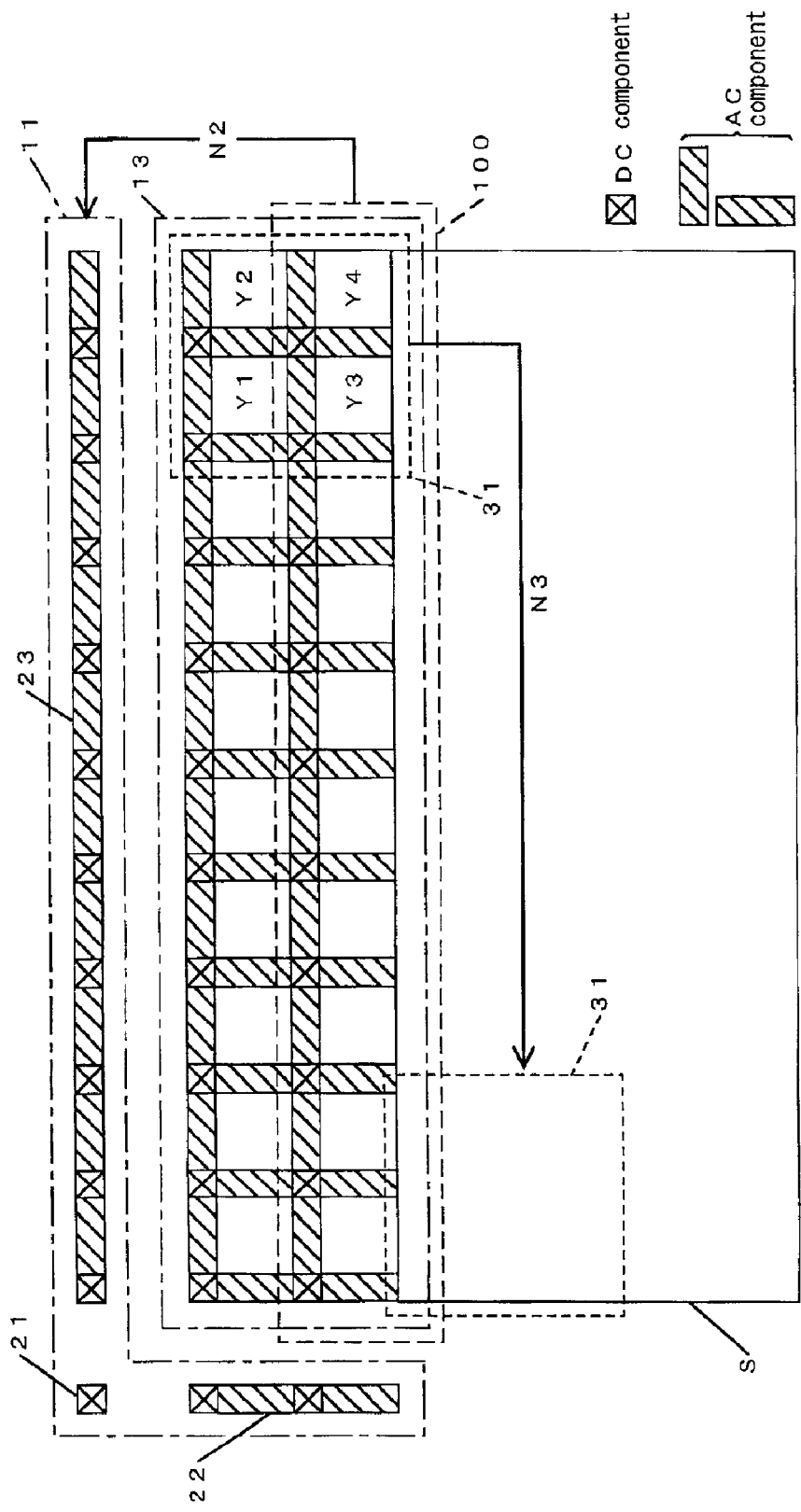

Referring to the flowchart in FIG. 7, and also to FIGS. 8–10, the prediction process carried out by prediction means 6 (the prediction process of step 14 of FIG. 6) is now described.

In step 20, prediction control means 10 sets a target area 31 for luminance and a target area 51 for chrominance to the target macro block at the upper left. In step 21, prediction computation means 15 performs prediction computation on the upper left luminance Y1, upper right luminance Y2, lower left luminance Y3, and lower right luminance Y4 as shown in FIG. 8. The predicted values obtained here are held in predicted luminance value storage means 13.

In step 22, prediction computation means 15 performs prediction computation concerning the chrominance values Cb and Cr as shown in FIG. 10. The predicted values obtained here are held in predicted chrominance storage means 14.

If in step 23, prediction control means 10 judges that the target macro block is not at the right end, prediction computation means 15 returns the predicted values to prediction control means 10.

After the processes of steps 15 through 18, shown in FIG. 6, are completed based on the abovementioned predicted values, the target macro block is advanced at step 19, and the process of step 14 is carried out based on the results of step 13.

In step 20 shown in FIG. 7, target macro block setting means 3 sets the target area 31 to the next target macro block as indicated by the arrow N1 (see FIG. 8). The same process is carried out for target area 51. The subsequent processes are the same as those described above.

When in step 23 shown in FIG. 7, prediction control means 10 judges that the target macro block is at the right end, step 24 is entered.

In step 24, prediction control means 10 copies the DC components and AC components held in the lower stage part 100 of predicted luminance value storage means 13 into the line part 23 as indicated by the arrow N2 of FIG. 9. Although the details will be described later, the reason for performing copying in this manner is to use the DC components and AC components copied into line part 23 as reference values for the prediction process of the target macro blocks of the next single line.

In step 25, prediction control means 10 copies the DC components and AC components held in predicted chrominance storage means 14 into the line part 43 as indicated by the arrow N4 of FIG. 10. The reason for performing copying in this manner is the same as that for the copying carried out in step 24.

In step 26, the predicted luminance value storage means 13 and predicted color value storage means 14 are shifted by one. That is, since the prediction process for the target macro blocks of a single line have been completed, predicted luminance value storage means 13 and predicted color value storage means 14 are used to hold the predicted values of the target macro blocks of the next single line.

In step 27, prediction control means 10 performs initial setting of corner parts 21 and 41 and left parts 22 and 42 in regard to luminance and chrominance.

Then after the processes of steps 15 through 18, shown in FIG. 6, are carried out based on the predicted values of the target macro block at the right end, the target macro block is renewed in step 19 and the process of step 14 is carried out based on the results of step 13.

In step 20 shown in FIG. 7, target macro block setting means 3 sets the target area 31 to the next target macro block as indicated by the arrow N3 (see FIG. 9). The same is carried out for target area 51. The subsequent processes are the same as those described above.

Figure 11:
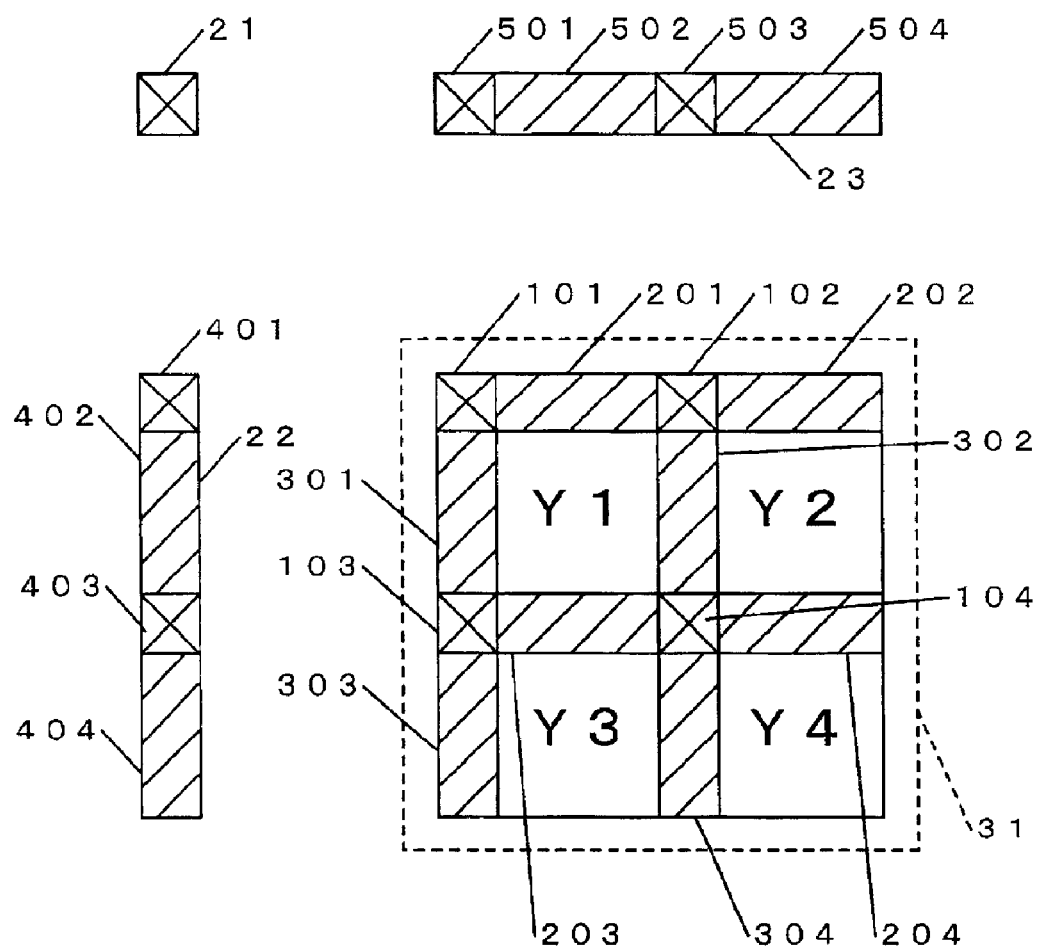
FIG. 11 is a diagram to which reference will be made in a specific DC/AC prediction process of Embodiment 1 of this invention.

The details of the prediction computation carried out in step 21 shown in FIG. 7 is now described with reference to FIG. 11. In FIG. 11, the portions that are the same as those in FIG. 8 are identified by the same reference designators.

The DC component 101 of luminance Y1 is predicted based on the DC component held in corner part 21, the DC component 501, and the DC component 401. The AC component 201 of luminance Y1 is predicted based on AC component 502. The AC component 301 of luminance Y1 is predicted based on AC component 402.

That is, the prediction computation is performed in accordance with the prediction computation principles that were described by way of FIGS. 3 through 5. DC component 101 corresponds to being the Fx[0][0] (see step 6 of FIG. 5) that is obtained using the PFx[0][0] of block X of FIG. 3. The DC component held in corner part 21 corresponds to being the Fb[0][0] of block B of FIG. 3. The DC component 401 corresponds to being the Fa[0][0] of block A of FIG. 3. The DC component 501 corresponds to being the Fc[0][0] of block C of FIG. 3.

Also, AC component 201 corresponds to being the Fx[j][0] (see step 8 of FIG. 5) that is obtained using the PFx[j][0] of block X of FIG. 4. The AC component 502 corresponds to being the Fc[j][0] of block C of FIG. 4. AC component 301 corresponds to being the Fx[0][i] (see step 9 of FIG. 5) that is obtained using the PFx[0][i] of block X of FIG. 4. The AC component 402 corresponds to being the Fa[0][i] of block A of FIG. 4.

The DC component 102 of luminance Y2 is predicted based on the DC components 503, 501, and 101. The AC component 202 of luminance Y2 is predicted based on AC component 504 and the AC component 302 of luminance Y2 is predicted based on the AC component 301. As with the above described prediction computation, this prediction computation is also in accordance with the prediction computation principles that were described using FIGS. 3 through 5.

The DC component 103 of luminance Y3 is predicted based on the DC components 101, 401, and 403. The AC component 203 of luminance Y3 is predicted based on AC component 201 and the AC component 303 of luminance Y3 is predicted based on the AC component 404. As with the above described prediction computation, this prediction computation is also in accordance with the prediction computation principles that were described using FIGS. 3 through 5.

The DC component 104 of luminance Y4 is predicted based on the DC components 102, 101, and 103. The AC component 204 of luminance Y4 is predicted based on AC component 202 and the AC component 304 of luminance Y4 is predicted based on the AC component 303. As with the above described prediction computation, this prediction computation is also in accordance with the prediction computation principles that were described using FIGS. 3 through 5.

Likewise, the prediction process is carried out for the other target blocks in accordance with the prediction computation principles that were described using FIGS. 3 through 5. The same applies to the prediction process concerning chrominance.

The meaning of the copying performed in step 24 shown in FIG. 7 is now described in detail with reference to FIG. 12.

Figure 12:
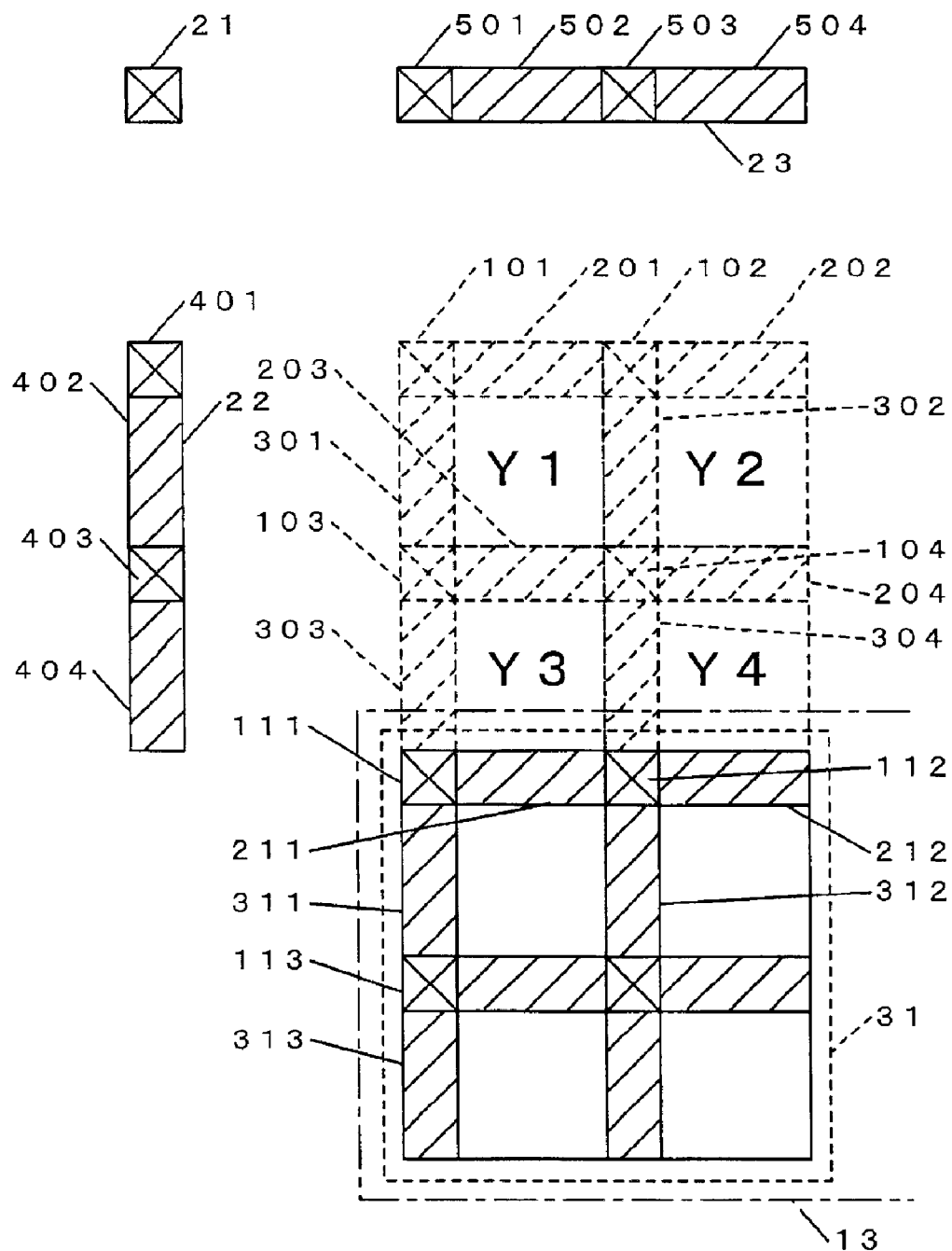
FIG. 12 is a diagram to which reference will be made in the copying by the prediction control means of Embodiment 1 of this invention.

FIG. 12 shows the condition where the target area 31 is set to the target block at the left end of the next single line as indicated by the arrow N3 of FIG. 9. In accordance to the prediction computation principles that were described with reference to FIGS. 3 through 5, in predicting the DC component 111, the DC component 103, the DC component held in corner part 21, and the DC component 401 must be used.

Likewise, to predict the AC component 211, the AC component 203 must be used. Likewise, to predict the DC component 112, the DC components 104, 103, and 111 must be used. Likewise, to predict the AC component 212, the AC component 204 must be used.

In step 26 shown in FIG. 7, although DC components 103, 104, etc., and AC components 203, 204, etc., (predicted values of the first single line) are held in predicted luminance value storage means 13 until predicted luminance value storage means 13 is shifted by one. After predicted luminance value storage means 13 is shifted as shown in FIG. 12, the DC components 111, 112, etc., and AC components 211, 212, etc., (the predicted values for the current single line) are written over the previous contents.

Thus if DC components 103 and 104 and AC components 203 and 204 are to be used to predict the DC components 111 and 112 and AC components 211 and 212, the DC components 103 and 104 and AC components 203 and 204 must be held in a memory area besides predicted luminance value storage means 13.

For this reason, DC components 103 and 104 and AC components 203 and 204 are copied into line part 23. In the present case, DC component 104 is overwritten into the area of line part 23 in which DC component 501 is held, AC component 203 is overwritten into the area in which AC component 502 is held, DC component 103 is overwritten into the area in which DC component 503 is held, and AC component 204 is overwritten into the area in which AC component 504 is held.

The above is the meaning of the copying process in step 24 shown in FIG. 7. The copying process in step 25 also has the same meaning.

As a result of such copying, DC component 111 is predicted using the DC component 103 that has been copied over DC component 501, the DC component held in corner part 21, and the DC component 401 held in left part 22.

DC component 112 is predicted using the DC component 104 that has been copied over DC component 503, the DC component 103 that has been copied over DC component 501, and the DC component 111.

AC component 211 is predicted using the AC component 203 that has been copied over AC component 502. AC component 212 is predicted using the AC component 204 that has been copied over AC component 504.

The DC components and AC components, which have been copied from the lower stage part 100 of predicted luminance value storage means 13 into line part 23 are thus used as reference values in the prediction of the target macro blocks subsequent to the target macro blocks of the first single line. The same applies to the prediction process for chrominance.

The DC components and AC components that have been input in line part 23 in the initial setting process are used as reference values in the prediction of the target macro blocks of the first single line (see step 11 of FIG. 6). The same applies to the prediction process for chrominance.

In accordance with the prediction computation principles described with reference to FIGS. 3 through 5, AC component 311 is predicted using AC component 402, DC component 113 is predicted using DC components 111, 401, and 403, and AC component 313 is predicted using AC component 404.

That is, the DC components 401 and 403 and AC components 402 and 404, which are held in left part 22, are used to predict the DC components and AC components at the left end (DC components 101, 103, 111, 113, etc., and AC components 301, 303, 311, 313, etc.). Also, as has been mentioned above, the DC component held in corner part 21 is used in the prediction of the DC components at the upper left of the target macro block at the left end (DC components 101, 111, etc). The same applies to the prediction process for chrominance.

Thus with Embodiment 1, the line part 23 of reference luminance value storage means 11 consists of areas that hold the DC components and AC components necessary for the prediction process of the target macro blocks of a single line of image size S.

After the prediction process of the target macro blocks of the current single line is completed, the DC components and AC components necessary for the prediction process of the target macro blocks of the next single line are copied into the line part 23 in which the DC components and AC components that have already been used in the prediction process of the target macro blocks of the current single line are held.

The DC components and AC components that have thus been copied into line part 23 are used in the prediction process of the target macro blocks of the next single line.

Thus by performing the prediction process while repeating copying in the above-described manner, the storage volume for the DC components and AC components (reference values) in reference luminance value storage means 11 is reduced. In addition, the area required for storing the DC components and AC components (predicted values) for the entire image size is not required in predicted luminance value storage means 13. The same can be said of the prediction process for chrominance.

As a result, the memory area used in the prediction process in the process of decoding a coded image signal is reduced.

Also, for the four luminance components of each target macro block, line part 23 has an area allocated for two sets of DC components and AC components. Left part 22 is allocated for two sets of DC components and AC components for the four luminance components of the target macro block.

The case where a target macro block is arranged of four luminance components in accordance with the standard specifications is thus accommodated adequately. This is especially favorable for the prediction process in the decoding of image signals that have been coded in accordance with the MPEG-4 specifications.

Also, line part 23 of reference luminance value storage means 11 consists of areas that hold the DC components and AC components necessary for the prediction process of the target macro blocks of a single line in image size S. That is, reference luminance value storage means 11 consists of areas in which the DC components and AC components of the respective positions are held in a process in which the target macro block is moved by one line. The same applies to the reference chrominance value storage means 12.

The copying by prediction control means 10 is performed in a batch of one line at time to thereby simplify the process.

Although five target macro blocks were contained in a single line of image size S in the above, the present invention is not limited thereto, and the magnitude of the image size can be set arbitrarily and the number of macro blocks contained in a single line may differ accordingly. Even in such cases, this invention provides the above-described effects regardless of image size.

(Embodiment 2)

The overall arrangement of the image decoding device of Embodiment 2 of this invention is the same as that of the image decoding device of FIG. 1, and the prediction means of the image decoding device of Embodiment 2 is the same as that of the prediction means shown in FIG. 2.

Also, the principles of DC/AC prediction (principles of prediction computation) carried out by the prediction means of Embodiment 2 are the same as the prediction computation principles that were described using FIGS. 3 through 5. The overall flow of the processes carried out by the image decoding device of Embodiment 2 are also the same as the flow shown in FIG. 6.

The image decoding device of Embodiment 2 differs from the image decoding device of Embodiment 1 in the method of the prediction process carried out by prediction means 6. A description that mainly concerns this aspect is now given with reference to FIGS. 13 through 19.

First, the details of reference luminance value storage means 11 and predicted luminance value storage means 13, which are shown in FIG. 2 and are necessary for carrying out the prediction process, are described.

Figure 14:
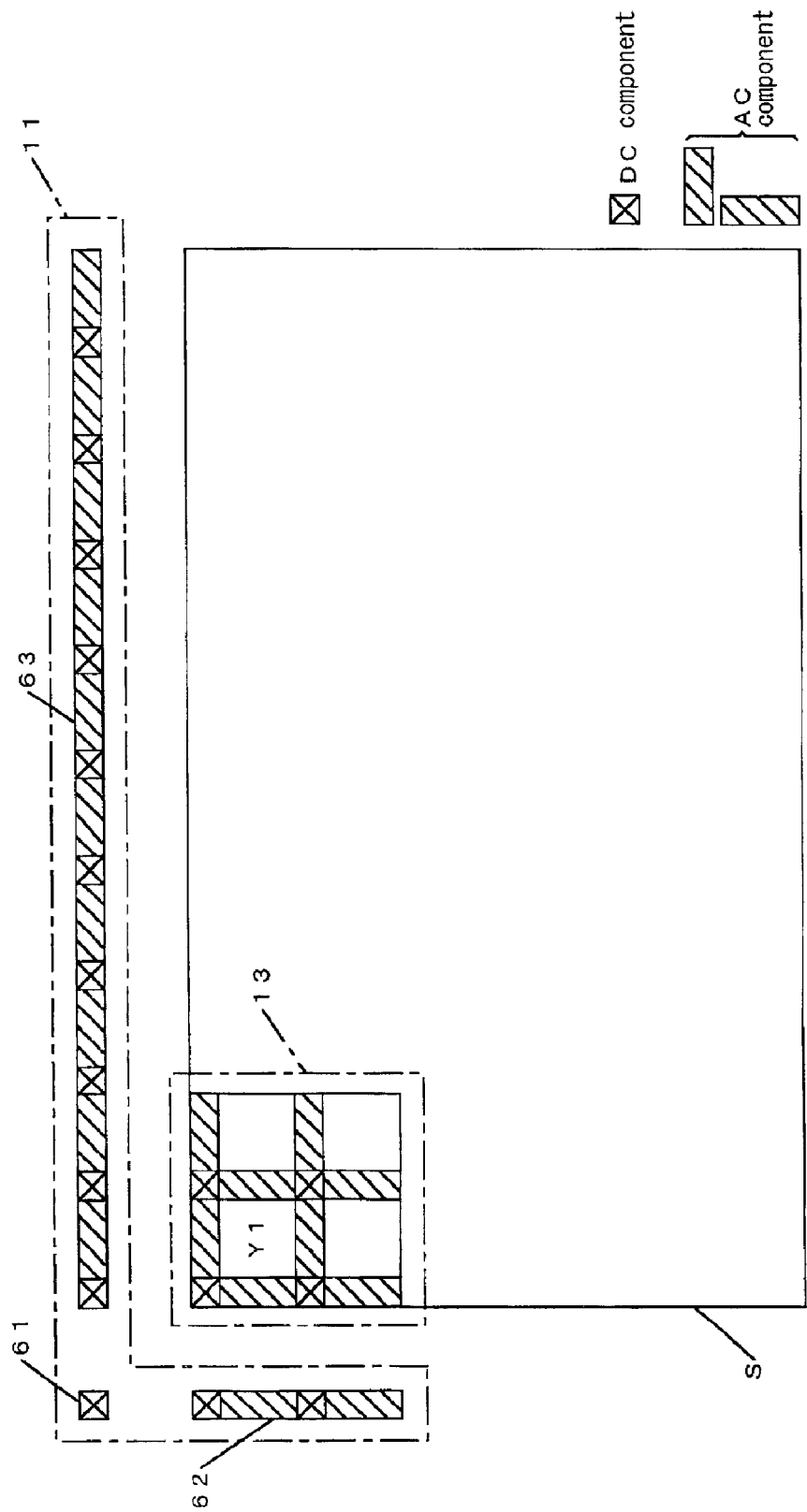
FIGS. 14 through 18 are diagrams to which reference will be made in the luminance prediction process of Embodiment 2 of this invention.

As shown in FIG. 14, reference luminance value storage means 11 has a line part 63, which holds the DC components and AC components of a single line in image size S, a corner part 61, which holds a single DC component, and a left part 62, which holds DC components and AC components. The DC components and AC components held by reference luminance value storage means 11 are reference values to be used in the process of carrying out the prediction process concerning luminance.

For the four luminance components of each target macro block, line part 63 has an area allocated for two sets of DC components and AC components. To be more specific, in the present example, since there are five target macro blocks in a single line in image size S, line part 63 consists of memory areas that hold ten DC components and ten AC components.

Left part 62 is allocated for two sets of DC components and AC components for the four luminance components of the target macro block. To be more specific, left part 62 consists of memory areas that hold two DC components and two AC components.

Predicted luminance value storage means 13 consists of memory areas that hold the DC components and AC components of the luminance of one target macro block. This is the major point of difference with respect to the predicted luminance value storage means 13 of Embodiment 1.

The DC components and AC components held in predicted luminance value storage means 13 are predicted values obtained as a result of the prediction process concerning luminance.

The details of the reference chrominance value storage means 12 and predicted chrominance value storage means 14, which are shown in FIG. 2 and are necessary for carrying out the prediction process, is now described.

Figure 19:
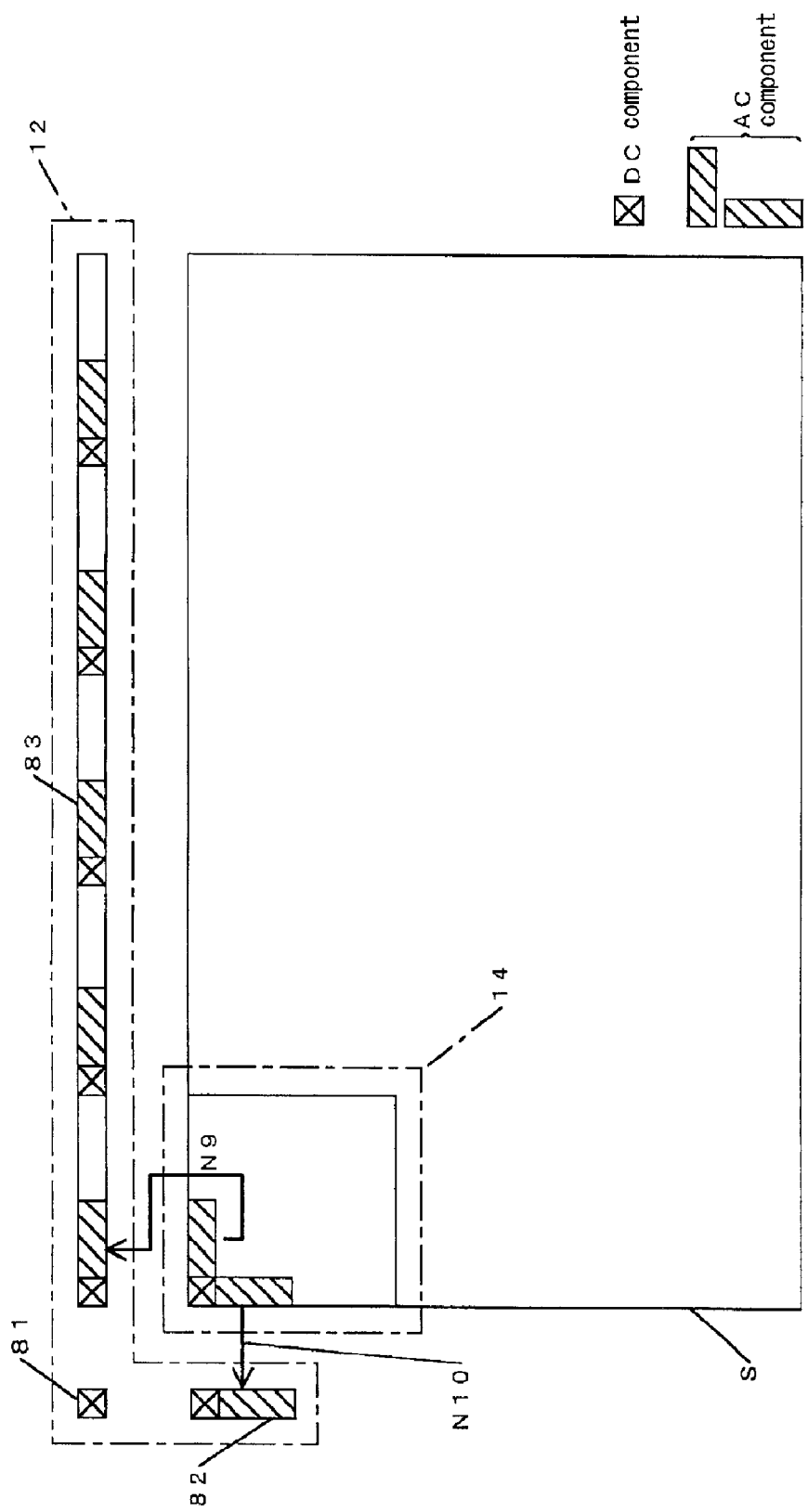
FIG. 19 is a diagram to which reference will be made in the chrominance prediction process of Embodiment 2 of this invention.

As shown in FIG. 19, reference chrominance value storage means 12 has a line part 83, which holds the DC components and AC components of a single line in image size S, a corner part 81, which holds a single DC component, and a left part 82, which holds DC components and AC components. The DC components and AC components held by reference chrominance value storage means 12 are reference values to be used in the process of carrying out the prediction process concerning chrominance.

For each target macro block, line part 83 has an area allocated for one set of DC components and AC components. To be more specific, in the present example, since there are five target macro blocks in a single line in image size S, line part 83 consists of memory areas that hold five DC components and five AC components.

Left part 82 is allocated for one set of DC components and AC components for the target macro block. To be more specific, left part 82 consists of memory areas that hold one DC component and one AC component.

Predicted chrominance value storage means 14 consists of memory areas that hold the DC components and AC components of the chrominance of one target macro block. This is the major point of difference with respect to the predicted chrominance value storage means 14 of Embodiment 1. The DC components and AC components held in predicted chrominance value storage means 14 are predicted values obtained as a result of the prediction process concerning chrominance.

Also, reference chrominance value storage means 12 and predicted chrominance value storage means 14 are provided respectively for the two types of chrominance, Cb and Cr.

The total of the reference value storage volumes of reference luminance value storage means 11 and reference chrominance value storage means 12 and the predicted value storage volumes of predicted luminance value storage means 13 and predicted chrominance value storage means 14 is smaller than the storage volume for the predicted luminance and chrominance values for the entire image size.

The prediction process carried out by prediction means 6 (the prediction process of step 14 of FIG. 6) is now described by way of FIGS. 13 through 19.

Figure 13:
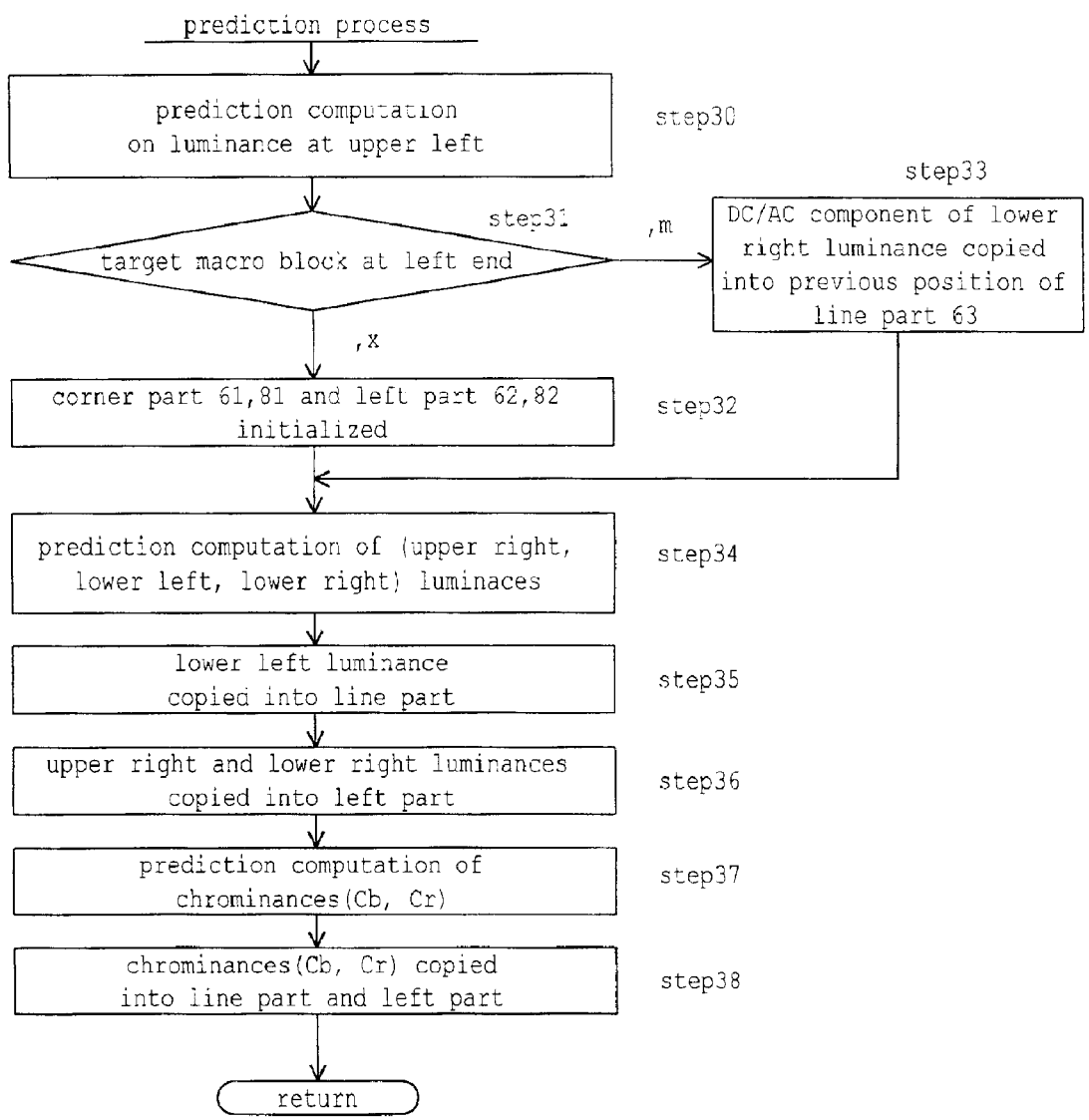
FIG. 13 is a flowchart, which shows the prediction process of Embodiment 2 of this invention.

As shown in FIGS. 13 and 14, in step 30, prediction computation means 15 performs prediction computation on luminance Y1 at the upper left of the target macro block. This prediction computation is performed in the same manner as in Embodiment 1. The predicted values obtained here are held in predicted luminance value storage means 13.

If in step 31, the target macro block is at the left end, step 32 is entered. In step 32, prediction control means 10 performs initial setting of the corner part 61 and left part 62, which are shown in FIG. 14, and the corner part 81 and left part 82, which are shown in FIG. 19.

Figure 15:
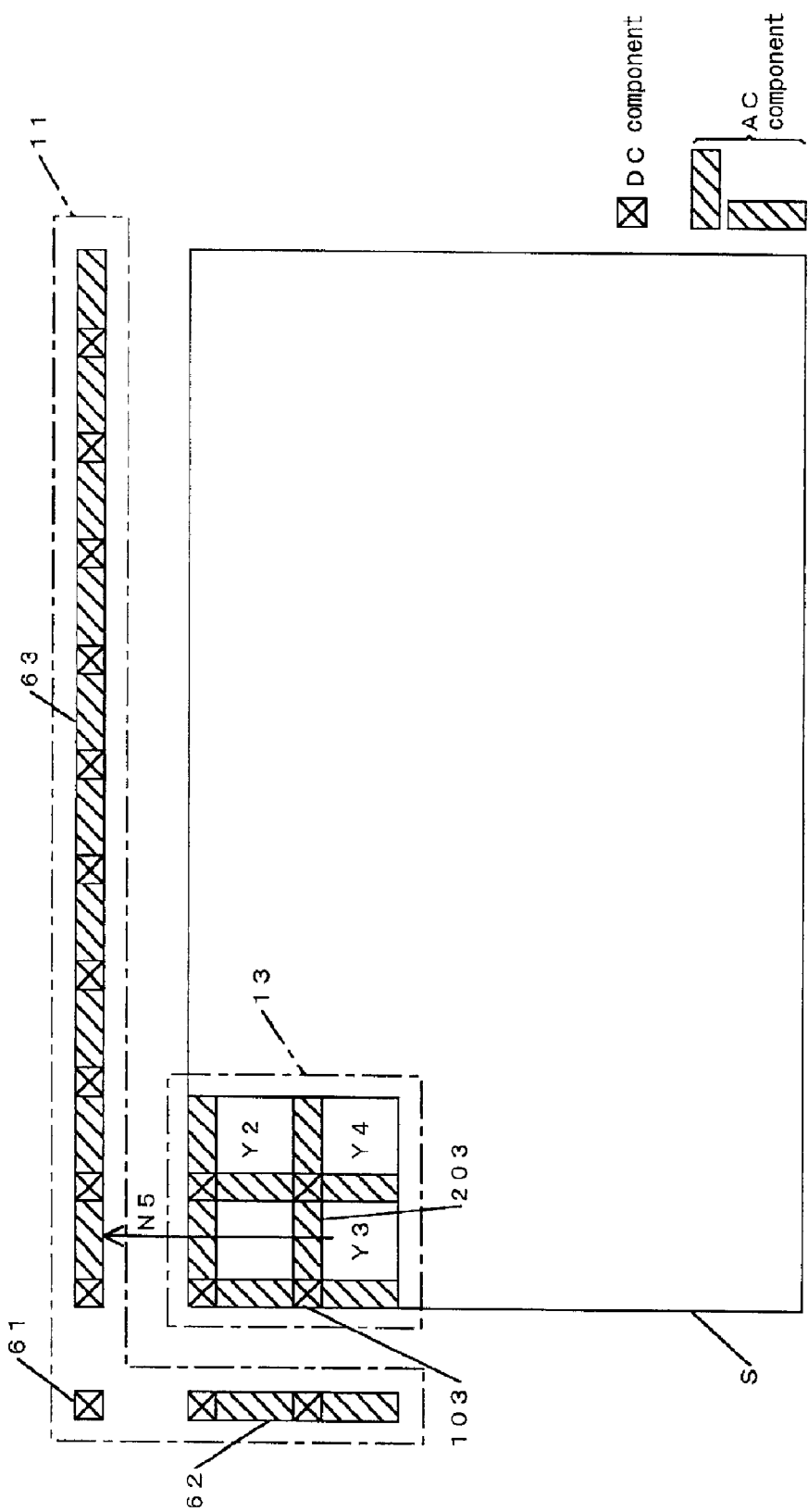

In step 34, prediction computation is performed on the upper right luminance Y2, lower left luminance Y3, and lower right luminance Y4 of the target macro block as shown in FIG. 15. This prediction computation is also performed in the same manner as in Embodiment 1. The predicted values obtained here are held in predicted luminance value storage means 13.

In step 35, prediction control means 10 copies the DC component 103 and AC component 203 for the lower left luminance Y3 from predicted luminance storage means 13 into line part 63 as indicated by the arrow N5.

The reason for performing copying in this manner is the same as that for the copying into line part 23 (see FIG. 9) carried out with Embodiment 1.

That is, the DC component and AC component are copied into line part 63 to be used as reference values for the prediction process of the target macro blocks of the next single line.

Figure 16:
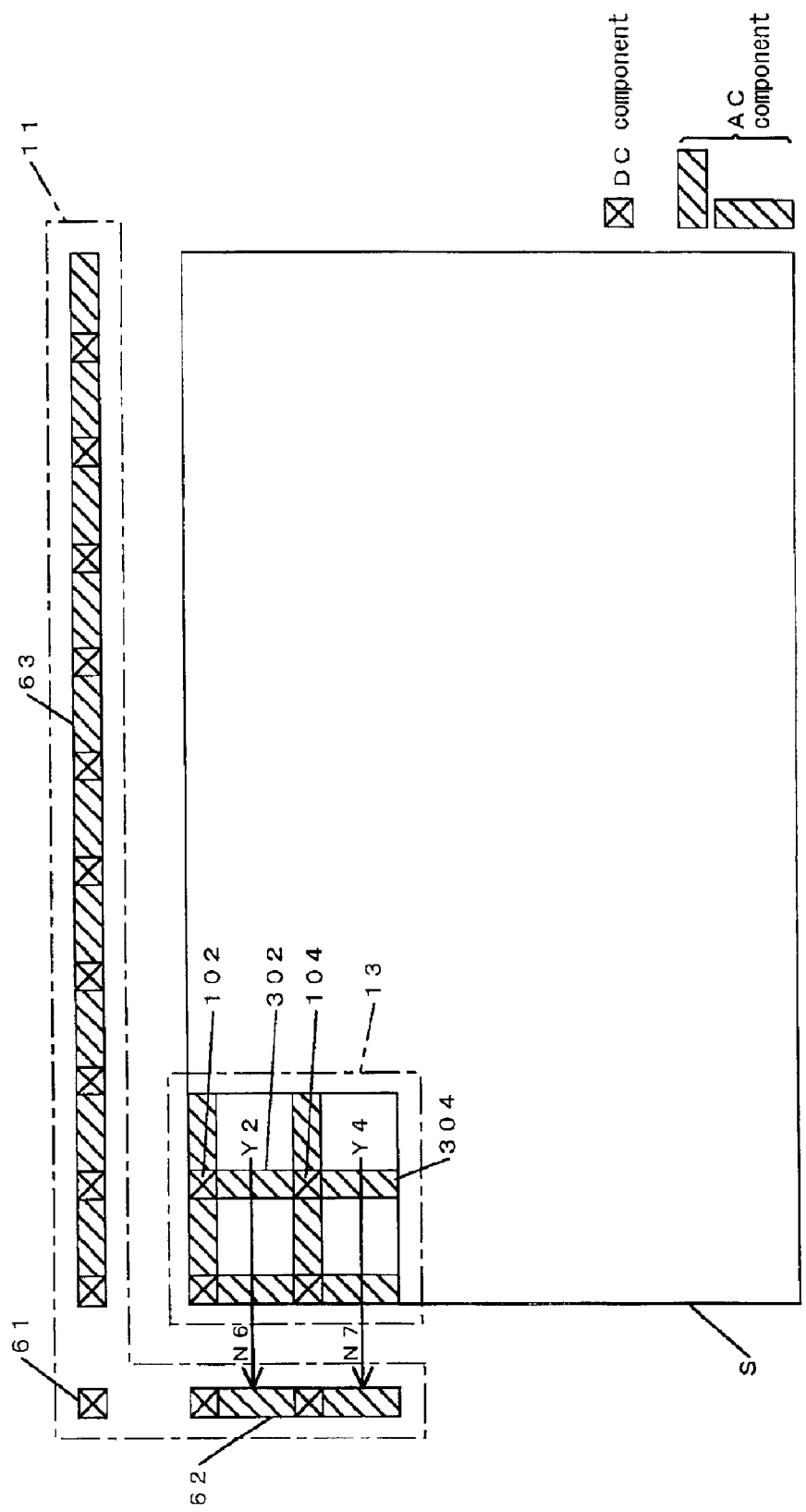

In step 36, prediction control means 10 copies the DC component 102 and AC component 302 of the upper right luminance Y2 and the DC component 104 and AC component 304 of the lower right luminance Y4 from predicted luminance value storage means 13 to left part 62 as indicated by the arrow N7 of FIG. 16. Although the meaning of this copying is described in detail later, the copying is performed to use the DC components 102 and 104 and AC components 302 and 304 as reference values in the prediction process of the adjacent target macro block to the right.

In step 37, prediction computation means 15 performs prediction computation on the target macro block on each of the chrominance values Cb and Cr. The predicted values obtained here are held in predicted chrominance value storage means 14.

In step 38, prediction control means 10 copies the DC components and AC components of the chrominance from predicted chrominance value storage means 14 into line part 83 as indicated by the arrow N9 of FIG. 19. The meaning of this copying is the same as that of the copying carried out in step 35.

Prediction control means 10 also copies the DC components and AC components of the chrominance into left part 82 as indicated by the arrow N10 of FIG. 19. The meaning of this copying is the same as that of the copying carried out in step 36.

Prediction computation means 15 then returns the predicted values obtained in the above to prediction control means 10. After the processes of steps 15 through 18 shown in FIG. 6 are then preformed based on these predicted values, the target macro block is renewed at step 19 and the process of step 14 is carried out based on the results of step 13.

Figure 17:
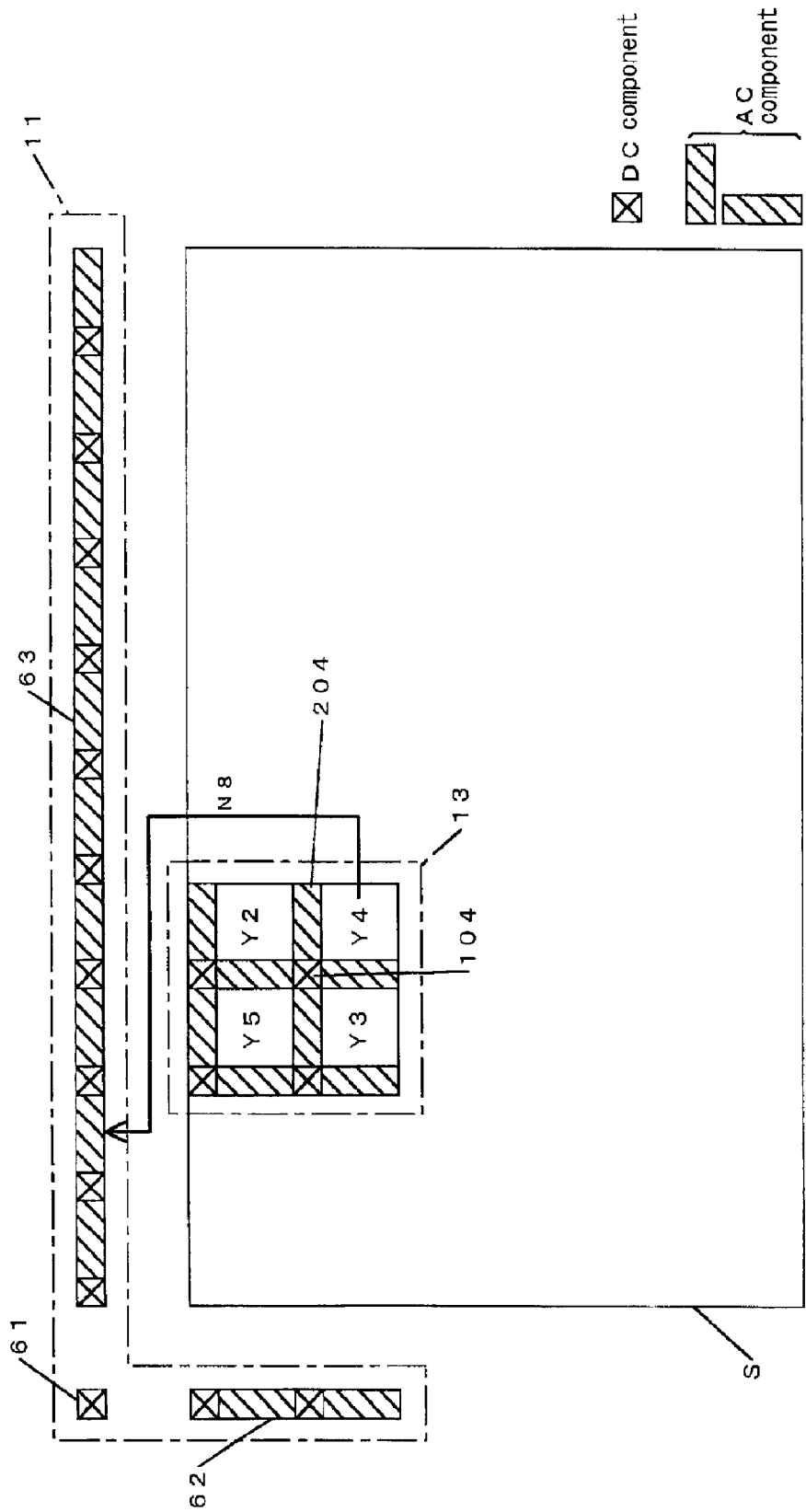

Here, in step 30 of FIG. 13, prediction computation is performed concerning the luminance Y5 at the upper left of the renewed target macro block as shown in FIG. 17. The predicted values obtained here are overwritten into the area in which the predicted values concerning luminance Y1 are held in predicted luminance value storage means 13.

Since predicted luminance value storage means 13 can only hold the predicted values for one target macro block, when the prediction process for one target macro block is completed, it is used to hold the predicted values (values for the luminance Y5 in the present case) of the next target macro block.

In the present case, since the target macro block is not at the left end in step 31, step 33 is entered. In step 33, prediction control means 10 copies the DC component 104 and AC component 204 of the lower right luminance Y4 of the target macro block from predicted luminance value storage means 13 to line part 63 as indicated by the arrow N8 of FIG. 17.

Here, the DC component 104 and AC component 204 are copied into an area of line part 63 that is adjacent to the area into which the DC component 103 and AC component 203 of luminance Y3 have been copied. The meaning of this copying is the same as that of the copying performed in step 35.

Figure 18:
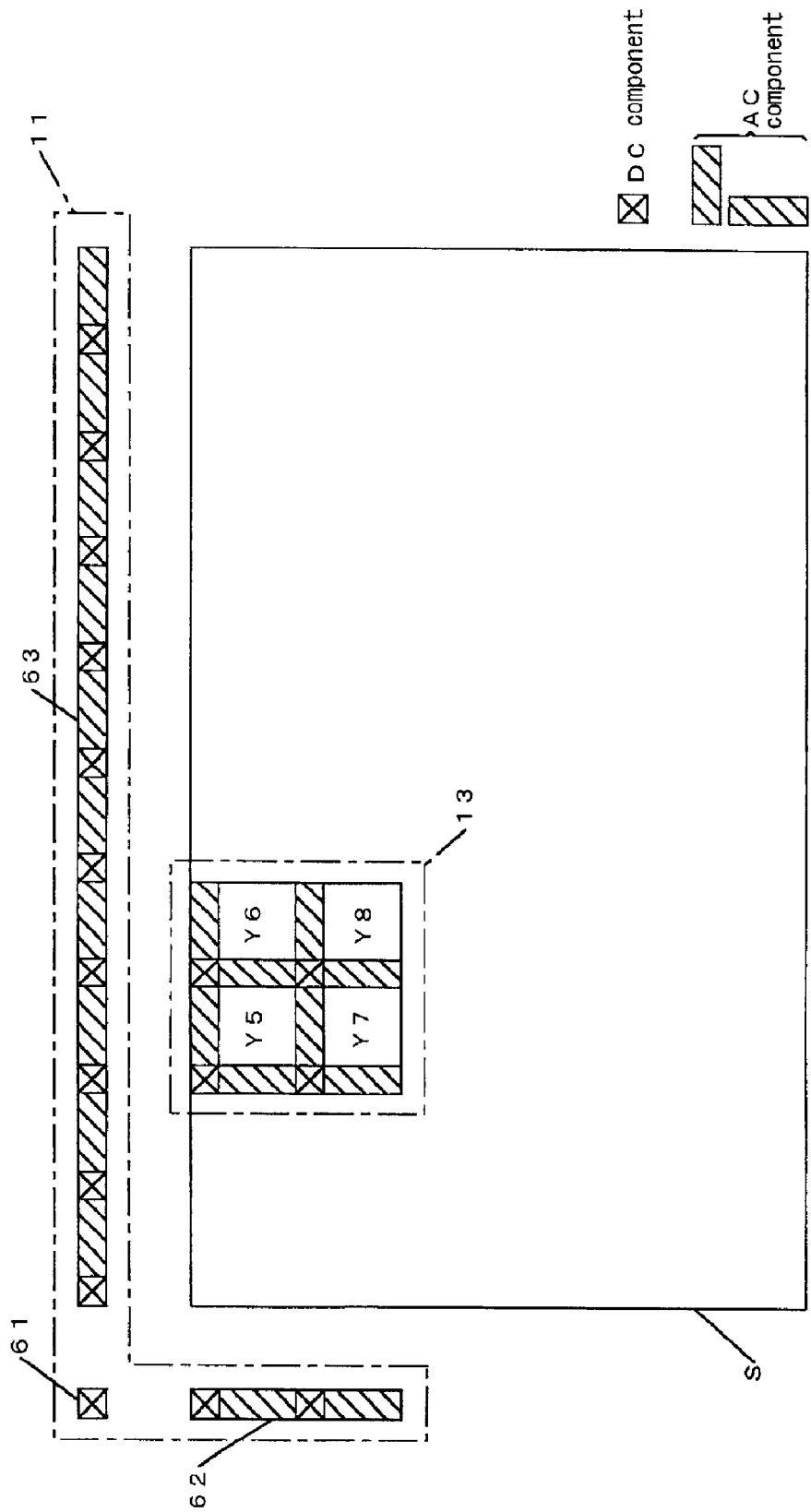

Step 34 is then entered and prediction computation means 15 performs the prediction computation concerning luminance Y6, Y7, and Y8 as shown in FIG. 18.

The obtained predicted values concerning the luminance Y6, Y7, and Y8 are respectively overwritten into the areas of predicted luminance value storage means 13 in which the luminance Y2, Y3, and Y4 were held. Thereafter, the processes of step 35 through step 38 are performed in the same manner as described above.

Figure 20:
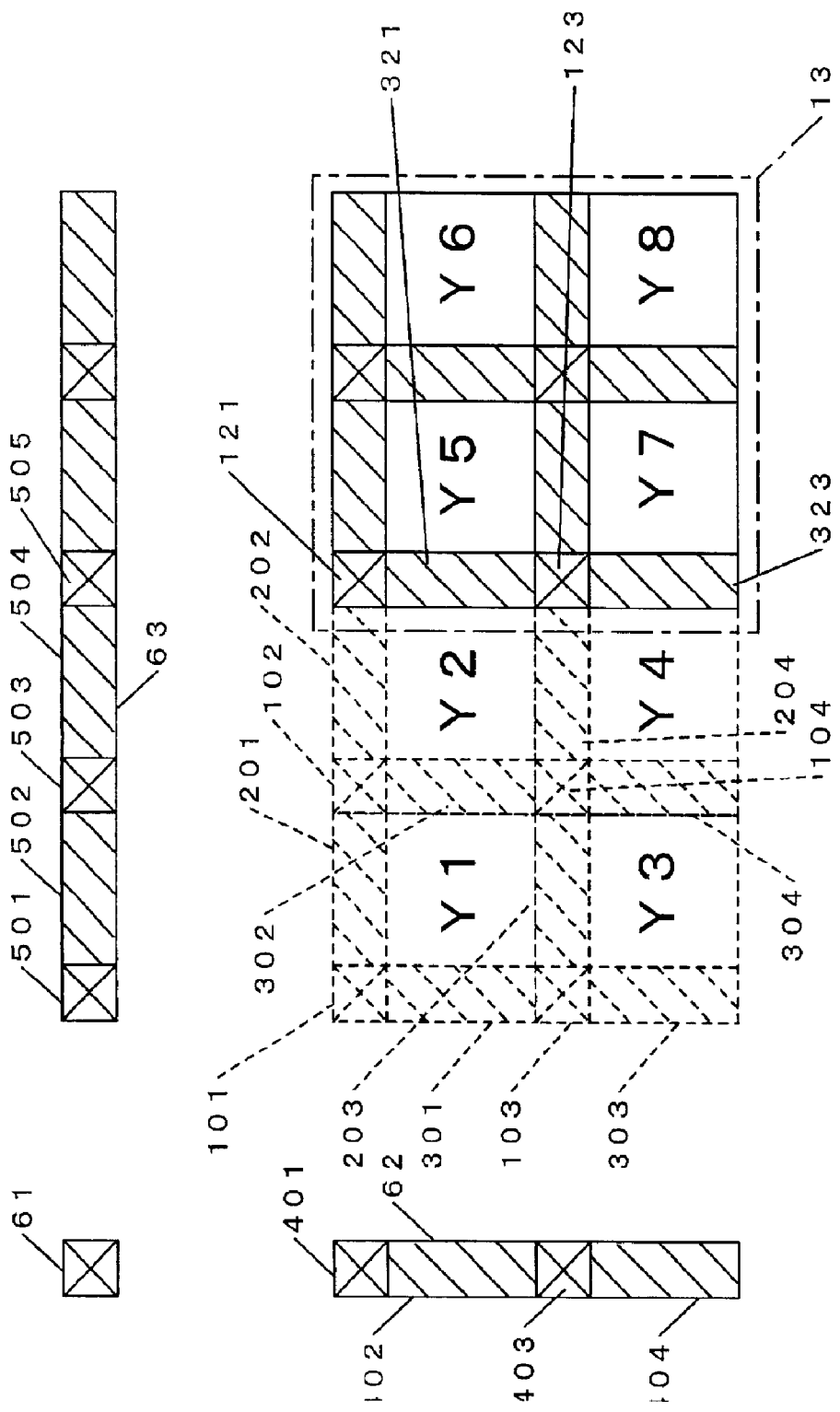
FIG. 20 is a diagram to which reference will be made in the copying by the prediction control means of Embodiment 2 of this invention.

The meaning of the copying performed in step 36 shown in FIG. 13 is now described in detail using FIG. 20. As shown in FIG. 20, in accordance with the prediction computation principles that were described using FIGS. 3 through 5, in predicting the DC component 121, the DC component 505, DC component 503, and DC component 102 are necessary.

Likewise, to predict the AC component 321, the AC component 302 must be used. Likewise, to predict the DC component 123, the DC components 121, 102, and 104 must be used. Likewise, to predict the AC component 323, the AC component 304 must be used.

However, though prior to performing the prediction process for the target macro block (luminance Y5 to Y8), the predicted values of the target macro block (luminance Y1 to Y4) indicated by the broken lines are held in predicted luminance value storage means 13, since predicted luminance value storage means 13 can hold only the predicted values for one target macro block, in performing the prediction process for the target macro block (luminance Y5 to Y8), the predicted values of the target macro block (luminance Y5 to Y8) become written over the previously held values.

Thus in the case where the DC components 102 and 104 and AC components 302 and 304 of the target macro block (luminance Y1 to Y4) are to be used to predict the DC components 121 and 123 and AC components 321 and 323 of the target macro block (luminance Y5 to Y8), the DC components 102 and 104 and AC components 302 and 304 must be held in a memory area besides predicted luminance value storage means 13.

For this reason, the DC components 102 and 104 and AC components 302 and 304 of the immediately prior block (luminance Y2 and Y4) that is located adjacent to the left side of the target macro block (luminance Y5 to Y8) are copied into left part 62.

In the present case, DC component 102 is overwritten into the area in which DC component 401 is held, AC component 302 is overwritten into the area in which AC component 402 is held, DC component 104 is overwritten into the area in which DC component 403 is held, and AC component 304 is overwritten into the area in which AC component 404 is held.

The above indicates the meaning of the copying process in step 36 shown in FIG. 13. The copying into the left part 82, which is carried out in step 38 has the same meaning.

As a result of such copying, DC component 121 is predicted using the DC components 505 and 503 and the DC component 102 that has been copied and is held in the area in which DC component 401 was held.

DC component 123 is predicted using the DC component 121, the DC component 102 that has been copied and is held in the area in which DC component 401 was held, and the DC component 104 that has been copied and is held in the area in which DC component 403 was held.

AC component 321 is predicted using the AC component 302 that has been copied and is held in the area in which AC component 402 was held. Also, AC component 323 is predicted using the AC component 304 that has been copied and is held in the area in which AC component 404 was held.

Thus in the prediction concerning target macro blocks besides the macro block at the left end, the DC components and AC components that have been copied from predicted luminance value storage means 13 into left part 62 are used as reference values. The same applies to the prediction process for chrominance.

Meanwhile, for the prediction of the target macro block at the left end, the DC components and AC components that were input into left part 62 in the process of initial setting are used as the reference values (see step 11 of FIG. 6 and step 32 of FIG. 13). The same applies to the prediction process for chrominance.

Also, as with Embodiment 1, the DC component stored in corner part 61 is used in the prediction of the upper left DC component (DC component 101, etc.) of the target macro block at the left end. The same applies to the prediction process for chrominance.

As shown in FIGS. 15 and 17, the process of copying the DC components and AC components of luminance Y3 and Y4 into line part 63 differs greatly from Embodiment 1, in which the DC components and AC components for a single line are copied in a batch into line part 23 (see FIG. 9).

That is, as shown in FIG. 17, the copying of the DC component 104 and AC component 204 of luminance Y4 is performed after the prediction process concerning luminance Y5 is completed, and is not performed at the same time as the copying of DC component 103 and AC component 203 of luminance Y3, shown in FIG. 15.

The meaning of this is now described with reference to FIG. 20.

When for example, the DC component 121 of luminance Y5 is to be predicted, the DC component 503, which has been input into line part 63 in the process of initial setting in step 11 of FIG. 6, is used.

However, if the DC component 104 of luminance Y4 is copied into the area of line part 63 in which DC component 503 is held before the prediction of the DC component 121 of luminance Y5, the prediction of the DC component 121 of luminance Y5 will be performed using the DC component 104 that has been copied into line part 63.

This would not be in accordance with the prediction computation principles described with reference to FIGS. 3 through 5. The DC component 104 and AC component 204 of luminance Y4 are thus copied into line part 63 after the prediction process concerning luminance Y5.

Thus, as in Embodiment 1, the DC components and AC components necessary for the prediction process of the target macro blocks of the next single line are copied into line part 63 of Embodiment 2 as shown in FIGS. 15 and 17.

The DC components and AC components that have been copied into line part 63 can thus be used as reference values in the prediction process of the target macro blocks of the next single line.

The performing of the prediction process while repeating such copying thus eliminates the need to hold the DC components and AC components necessary for the prediction process of the target macro blocks of the next single line in predicted luminance value storage means 13.

With Embodiment 2, when the prediction process of the current single target block (luminance Y1 to Y4) is completed, the DC components 102 and 104 and AC components 302 and 304, which are the prediction results, in other words, the DC components 102 and 104 and AC components 302 and 304, which are necessary for the prediction process of the next target macro block (luminance Y5 to Y8) (which is adjacent to the right) are copied from predicted luminance value storage means 13 to left part 62 as shown in FIG. 16.

The DC components 102 and 104 and AC components 302 and 304, which have been copied into left part 62, can thus be used in the prediction of the next target macro block (luminance Y5 to Y8) (which is adjacent to the right).

The performing of the prediction process while repeating such copying eliminates the need to hold the DC components 102 and 104 and AC components 302 and 304 of the current target block (luminance Y1 to Y4) in predicted luminance value storage means 13 for the prediction process of the next target macro block (luminance Y5 to Y8) (which is adjacent to the right).

As a result of the above, with Embodiment 2, only an area for holding the DC components and AC components for a single target block needs to be secured in predicted luminance value storage means 13. The same can be said of predicted chrominance storage means 14.

The memory area to be used in the prediction process in the decoding of a coded image signal can thus be lessened significantly.

For the same reasons given above for Embodiment 1, the case where a target macro block is arranged of four luminance components in accordance with the standard specifications can thus be accommodated adequately. This is especially favorable for the prediction process in the decoding of image signals that have been coded in accordance with the MPEG-4 specifications.

Also, although five target macro blocks were contained in a single line in image size S in the above, the present invention is not limited thereto. The magnitude of the image size can be set arbitrarily and the number of macro blocks contained in a single line may differ accordingly. Even in such cases, this invention provides the above-described effects regardless of image size.

By this invention, the memory used for the prediction process is reduced significantly to enable the consumption of power in an image processor to be limited, the duration of continuous use of equipment equipped with the processor to be extended, and the production cost of the processor to be reduced.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An image decoding device, which decodes in target macro block units, coded image signals that are coded by DCT, quantization, and variable-length coding, comprising:

a target macro block setting means for setting a target macro block to be decoded currently from among an entire image to identify a target macro block;

a target macro block extraction means for performing a variable length decoding process and a zigzag scan on said coded image signal and extracts data of said target macro block to produce an extracted target macro block data, a prediction means for performing a DC/AC prediction process on said extracted target macro block data, an inverse quantization means for performing inverse quantization on said target macro block data that have been subject to said prediction process, and an inverse DCT means for performing inverse DCT on said target macro block data that have been subject to inverse quantization and outputs an image of said target macro block;

said prediction means includes a reference value storage means;

said reference value storage means including means for holding reference values that are necessary for said prediction process performed on said target macro block;

a prediction computation means for performing prediction computation based on reference values of said reference value storage means;

a predicted value storage means for holding results of said prediction computation;

a prediction control means for controlling said reference value storage means, said prediction computation means, and said predicted value storage means; and a total storage volume of said reference value storage means and said predicted value storage means is smaller than a storage volume of predicted values for an entire image size, and said prediction control means includes means for copying data, necessary for said prediction computation of a next target macro block, from said predicted value storage means to said reference value storage means.

2. An image decoding device as set forth in claim 1, wherein:
- said reference value storage means includes means for holding a line part;
- said line part includes DC components and AC components for a single line in said image size;
- said reference value storage means further includes means for holding a corner part;
- said corner part including one DC component
- said reference value storage means further includes a left part; and
- said left part includes DC components and AC components of a block located immediately prior and adjacently to a left side of said target macro block.

3. An image decoding device as set forth in claim 2, wherein for four luminance components of each target macro block, said line part includes an area allocated for two sets of DC components and AC components.

4. An image decoding device as set forth in claim 2, wherein said left part is allocated for two sets of DC components and AC components for said four luminance components of said target macro block.

5. An image decoding device as set forth in claim 3, wherein said left part is allocated for two sets of DC components and AC components for said four luminance components of said target macro block.

6. An image decoding device as set forth in claim 1, wherein said predicted value storage means includes areas for holding DC components and AC components of respective positions in a process in which said target macro block is moved by one line in said image size.

7. An image decoding device as set forth in claim 1, wherein said predicted value storage means includes an area for holding said DC components and AC components of one target macro block.

8. An image decoding device as set forth in claim 2, wherein said predicted value storage means includes an area for holding said DC components and AC components of one target macro block.

9. An image decoding device as set forth in claim 3, wherein said predicted value storage means includes an area for holding said DC components and AC components of one target macro block.

10. An image decoding device as set forth in claim 4, wherein said predicted value storage means includes an area for holding said DC components and AC components of one target macro block.

11. An image decoding method for decoding, in target macro block units, of coded image signals that are coded by DCT, quantization, and variable-length coding, comprising:
- setting a target macro block to be decoded currently, to identify a set target block;
- performing a variable length decoding process and a zigzag scan on said coded image signal and extracting data of said target macro block to produce extracted target macro block data;
- performing a DC/AC prediction process on said extracted target macro block data;
- performing inverse quantization on target macro block data that have been subject to the prediction process;
- performing inverse DCT on said target macro block data that have been subject to inverse quantization and outputting an image of this target macro block;
- said step of performing a DC/AC prediction process includes performing said DC/AC prediction process while copying data, necessary for said prediction computation of a next target block, into a storage area; and
- said storage area being smaller than a storage area that would be required for storage of data of an entire image.

* * * * *

UNITED STATES PATENT AND TRADEMARK OFFICE
CERTIFICATE OF CORRECTION

PATENT NO. : 6,920,176 B2  
DATED : July 19, 2005  
INVENTOR(S) : Satoshi Kajita et al.

It is certified that error appears in the above-identified patent and that said Letters Patent is hereby corrected as shown below:

Drawings,
Sheet 1 of 20, Box 4, Line 1 (Fig. 1), delete "larget" and insert -- target --.
Sheet 1 of 20, Box 2, Line 2 (Fig. 1), delete "mage" and insert -- image --.
Sheet 6 of 20, Step 11, Line 2 (Fig. 6), delete "refernece" and insert -- reference --.
Sheet 6 of 20, Step 12, Line 1 (Fig. 6), delete "intialized" and insert -- initialized --.
Sheet 6 of 20, Step 13, Line 2 (Fig. 6), delete "larget" and insert -- target --.
Sheet 7 of 20, Step 24, Line 1 (Fig. 7), delete "lowor" and insert -- lower --.
Sheet 7 of 20, Step 24, Line 1 (Fig. 7), delete "luminaces" and insert -- luminances --.
Sheet 13 of 20, Step 34, Line 2 (Fig. 13), delete "luminaces" and insert -- luminances --.

Column 1,
Line 30, delete "abovementioned" and insert -- above mentioned --.

Column 6,
Line 49, delete "(Fa[j][0]xQref)" and insert -- (Fc[j][0]xQref) --.

Signed and Sealed this

Fifteenth Day of November, 2005

JON W. DUDAS  
*Director of the United States Patent and Trademark Office*